(12) United States Patent
Kawai et al.

(10) Patent No.: US 6,678,464 B1
(45) Date of Patent: Jan. 13, 2004

(54) PREVENTING COPYING OF DIGITAL INFORMATION

(75) Inventors: Kenji Kawai, Tokyo (JP); Masamichi Ito, Machida (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/217,135

(22) Filed: Dec. 21, 1998

(30) Foreign Application Priority Data

Dec. 26, 1997 (JP) .............................. 9-359806
Dec. 26, 1997 (JP) .............................. 9-359831

(51) Int. Cl.$^7$ .................................................. H04N 5/91
(52) U.S. Cl. ........................................... 386/94; 386/95
(58) Field of Search .............................. 386/46, 94, 95; 380/203; 360/60; 386/52

(56) References Cited

U.S. PATENT DOCUMENTS 5,987,126 A * 11/1999 Okuyama et al. .............. 380/5
6,034,832 A * 3/2000 Ichimura et al. .............. 386/94
6,298,196 B1 * 10/2001 Shima et al. .................. 386/94

* cited by examiner

Primary Examiner—Huy Nguyen
(74) Attorney, Agent, or Firm—Fitzpatrick, Cella, Harper & Scinto

(57) ABSTRACT

In a network for broadcast communication of digital information composed of image, audio etc., prior to the broadcasting of the digital information of which copying is limited, there is discriminated whether a recording device is present on the network and the output of the digital information is controlled according to the result of discrimination. If the recording device is present, the digital interface or the recording function of the recording device is so controlled that the broadcast digital information cannot be recorded. Thus, in case the digital information of which copying is limited is broadcast on the network, there can be prevented the unlawful copying or erroneous recording of such digital information.

6 Claims, 19 Drawing Sheets

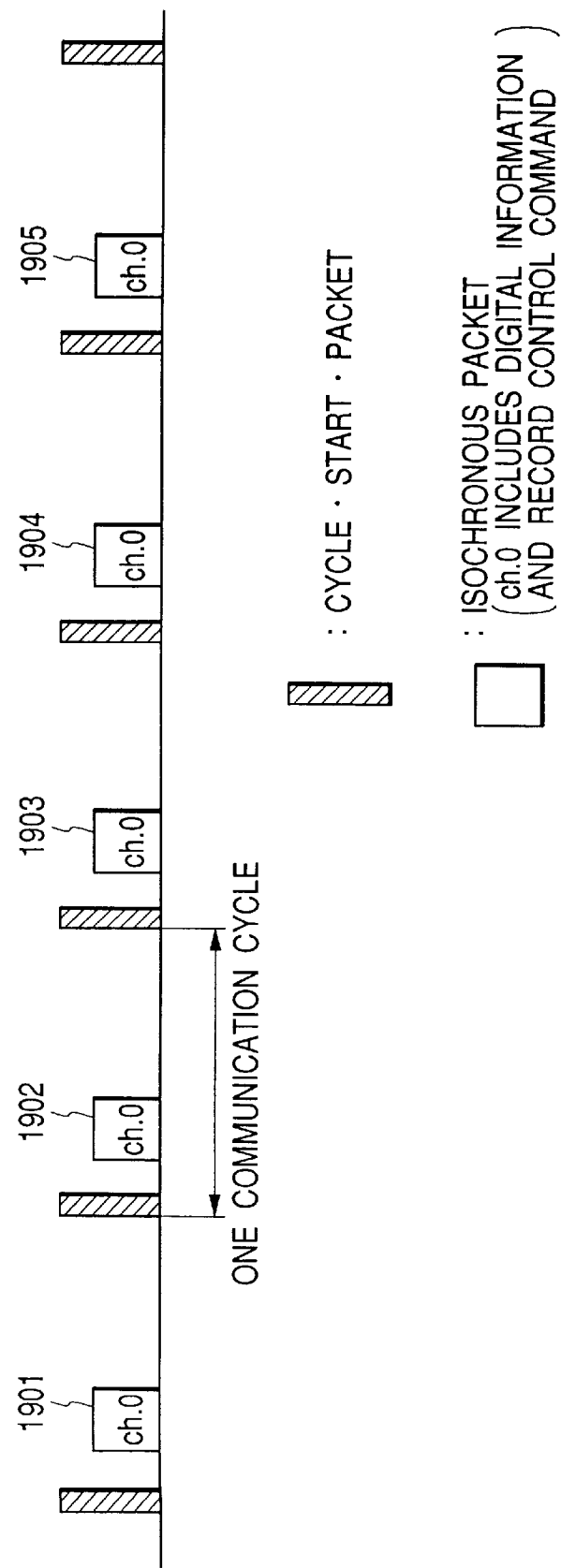

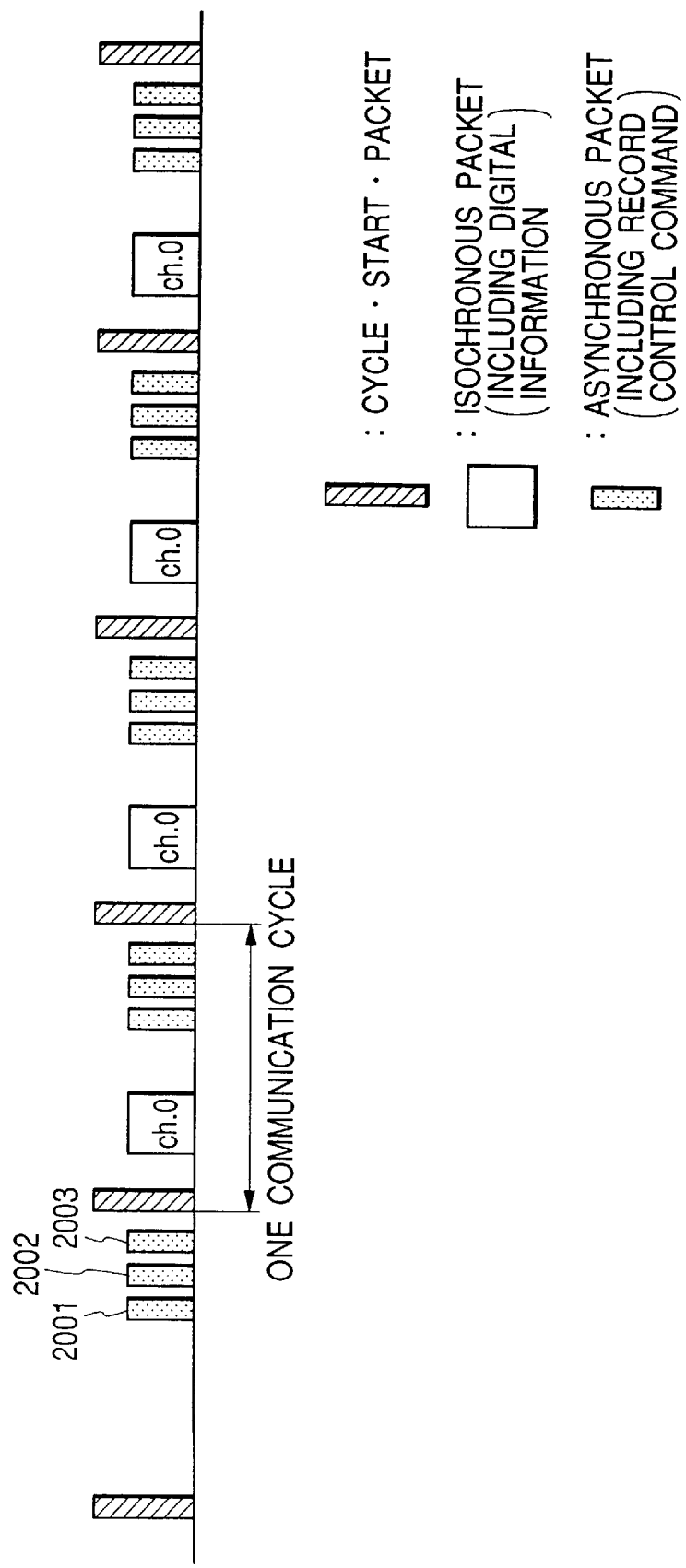

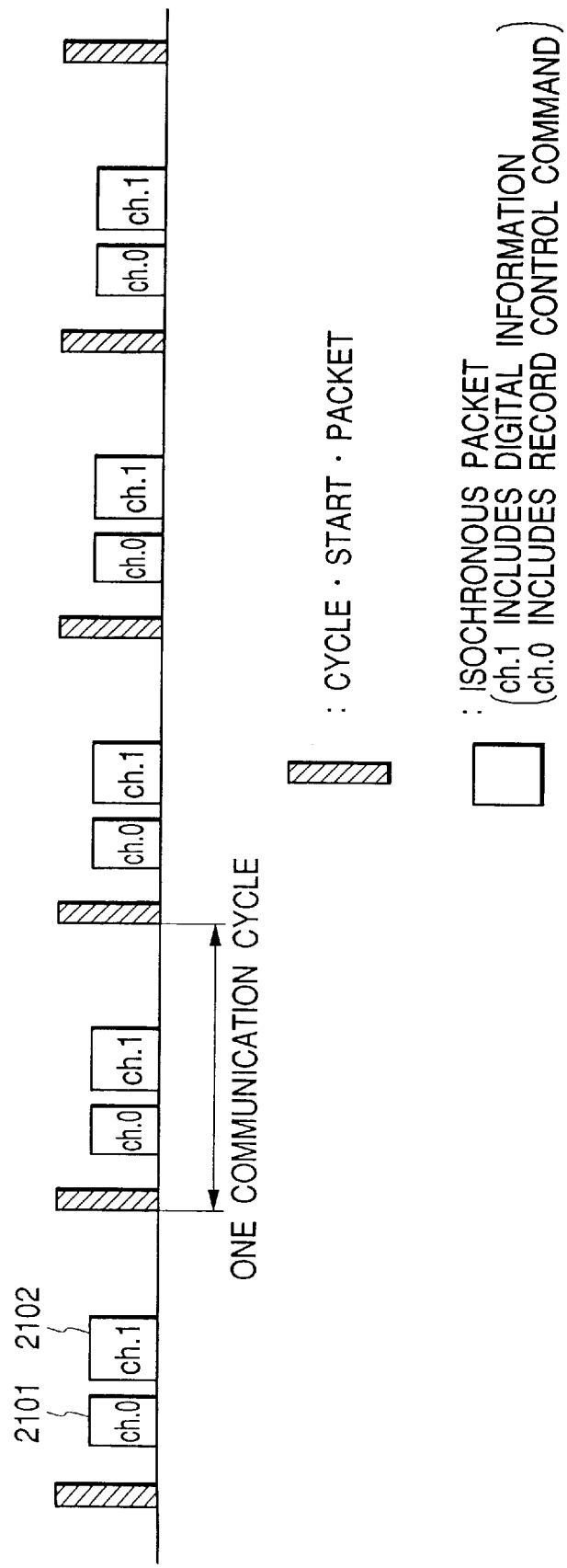

PREVENTING COPYING OF DIGITAL INFORMATION

BACKGROUND OF THE INVENTION

1. Field of the Invention

The present invention relates to a communication apparatus and a method therefor, and more particularly to a network capable of communication of information signal, such as digitized image or audio, and control signal in a mixed manner.

2. Related Background Art

Electronic devices capable of handing image and audio as digital information have been recently developed. A network capable bidirectional communicational can thus be constructed by connecting such electronic devices through a common digital interface.

In such network, digital information outputted from a device may be relayed by other devices, whereby same digital information can be transmitted to all the devices present on the network. Stated differently, any device can broadcast the desired digital information onto the network.

The digital information (image, audio, text, graphics etc.) broadcast on the network can ordinarily be received by all the devices present on the network. For example, if a recording device such as a digital audio cassette recorder is present on the network, such recording device can receive and record the broadcast digital information.

On the other hand, the digitized information normally has a feature of being almost free from deterioration in transmission or in recording. Also the digital information once recorded has a feature of being almost free from deterioration even after repeated reproduction. Owing to these features, the user who has copied the original data can always enjoy the copied data of a quality comparable to that of the original data, without any deterioration.

Consequently, the reception and recording of the digital information broadcast on the network by a recording device connected to the above-described network may harm the copyright of the digital information. Besides, the digital information recorded by the above-described recording device may be further copied and redistributed to other users, thus significantly harming the copyright of the information.

SUMMARY OF THE INVENTION

An object of the present invention is to solve the above-described problems.

Another object of the present invention is to provide a communication apparatus and a method therefor adapted, in a network for broadcasting digital data, to limit the recording of digital data for which copying is inhibited or limited.

As a preferred embodiment for such objects, the present invention discloses a communication apparatus comprising a detection unit for detecting whether a copying of digital information is limited; a communication unit for broadcasting the digital information to an external network; and a control unit for controlling the recording function of a recording device connected to the network, based on a result of detection by the detection unit.

As another embodiment, the present invention discloses a communication apparatus comprising a detection unit for detecting whether a copying of digital information is limited; a communication unit for broadcasting the digital information to an external network; and a control unit for controlling the communicating function of a recording device connected to the network, based on a result of detection by the detection unit.

As still another embodiment, the present invention discloses a communication apparatus comprising a detection unit for detecting whether a copying of digital information is limited; a generation unit for generating a command inhibiting a recording of the digital information; and a communication unit for broadcasting the digital information to an external network; wherein the communication unit transmits the digital information and the command on time shared basis to the network.

As still another embodiment, the present invention discloses a communication apparatus comprising a communication unit accommodating isochronous transfer and asynchronous transfer and adapted to broadcast digital information; a detection unit for detecting whether a recording device is present on a network connected through the communication unit; and a control unit for controlling the communication unit based on a result of detection by the detection unit.

As still another embodiment, the present invention discloses a communication apparatus comprising a detection unit for detecting whether a copying of digital information is limited; a communication unit for broadcasting the digital information to an external network; a control unit for effecting control in such a manner that the communication does not broadcast the digital information, based on a result of detection by the detection unit; and a display unit for effecting display based on a result of control by the control unit.

Furthermore, as a preferred embodiment for such objects, the present invention discloses a communication method comprising a detection step of detecting whether the copying of digital information is limited; a communication step of broadcasting digital information to an external network; and a control step of controlling the recording function of a recording device connected to the network, based on a result of detection by the detection step.

As another embodiment, the present invention discloses a communication method comprising a detection step of detecting whether the copying of digital information is limited; a communication step of broadcasting the digital information to an external network; and a control step of controlling a communicating function of a recording device connected to the network, based on a result of detection by the detection step.

As still another embodiment, the present invention discloses a communication method comprising a detecting whether the copying of digital information is limited; generating a command for inhibiting a recording of digital information; and a transmitting the digital information and the command based on time shared basis; wherein the digital information is broadcasted to an external network.

As still another embodiment, the present invention discloses a communication method comprising a communication step of accommodating isochronous transfer and asynchronous transfer and broadcasting digital information; a detection step of detecting whether a recording device is present on a network connected by the communication step; and a control step of controlling the communication means based on a result of detection by the detection step.

As still another embodiment, the present invention discloses a communication method comprising a detection step of detecting whether a copying of digital information is limited; a communication step of broadcasting the digital information to an external network; a control step of effecting control in such a manner that the communication unit does not broadcast the digital information, based on a result of detection by the detection step; and a display step of effecting display based on a result of control by the control step.

Still other objects of the present invention, and the advantages thereof, will become fully apparent from the following detailed description of the embodiments.

BRIEF DESCRIPTION OF THE DRAWINGS

FIG. 19 is a view showing an example of the procedure of broadcasting digital information in the sixth embodiment;

FIG. 20 is a view showing another example of the procedure of broadcasting digital information in the sixth embodiment; and FIG. 21 is a view showing still another example of the procedure of broadcasting digital information in the sixth embodiment.

DESCRIPTION OF THE PREFERRED EMBODIMENTS

The preferred embodiments of the present invention will now be described in detail hereinafter with reference to the accompanying drawings.

Figure 1:
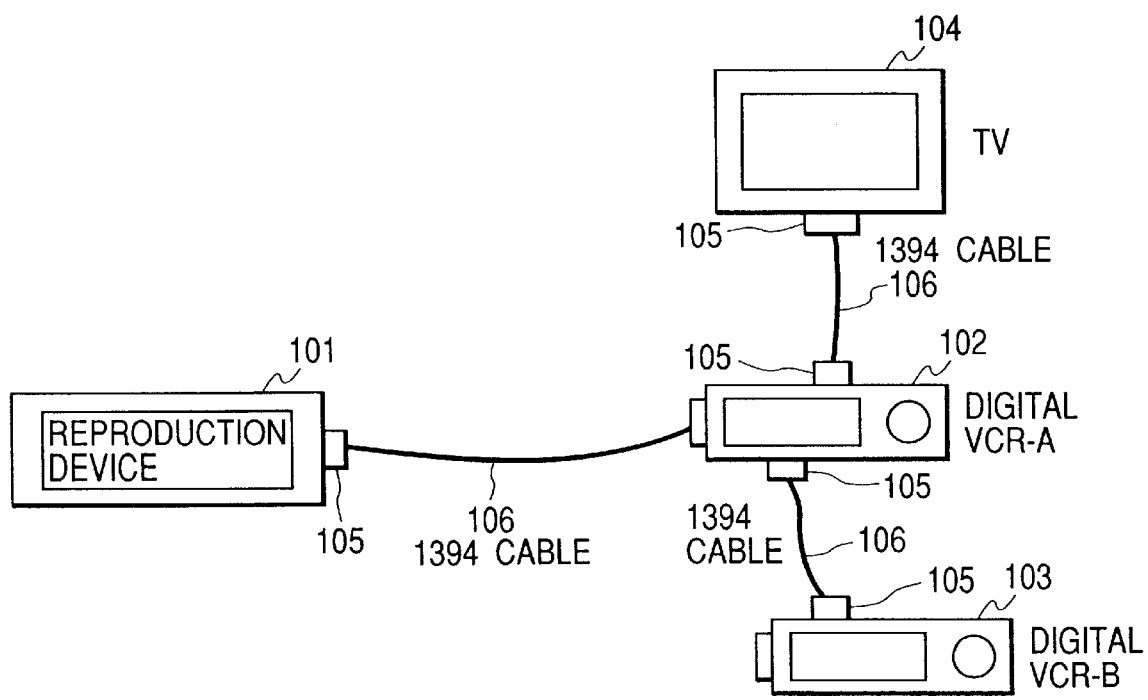
FIG. 1 is a block diagram showing the configuration of a communication system constituting first to sixth embodiments.

FIG. 1 is a view showing the configuration of a communication system constituting first to sixth embodiments.

Each of the communication devices shown in FIG. 1 is equipped with a digital interface based on the IEEE 1394 standard (hereinafter called 1394 interface). A bus-type network capable of broadcast communication (hereinafter called 1394 network) can be constructed by mutually connecting such devices through the 1394 interfaces.

Referring to FIG. 1, a reproduction device 101 (for example, a DVD player) reproduces a recording medium (for example, a magnetic tape, a magnetic disk, a magneto-optical disk, etc.) containing digital information (including digital data such as image, audio, text, graphics, programs etc.) of which copying is inhibited. The reproduction device 101 has a function of synchronous transfer of the above-mentioned digital information on real-time basis.

A recording device 102 records the digital information, outputted to the network, on a recording medium. In the present embodiment, the recording device 102 is constituted by a digital video cassette recorder (hereinafter represented as digital VCR-A) for recording the above-mentioned digital information in a recording cassette containing a recording medium such as a magnetic tape or a magnetic disk. A recording device 103, or digital VCR-B, has a configuration and a function similar to those of the digital VCR-A.

A monitor 104 converts the video and audio information entered through the network into image and audio signals based on a standard television format (such as NTSC or PAL) and audio-visually outputting these signals. The TV monitor 104 is also equipped with a recording medium such as a hard disk and has a function of recording the digital information on the network, as in the above-described recording device.

There are also provided communication ports 105 based on the IEEE 1394 standard, and communication cables 106 for connecting the communication ports provided on the communication devices 101 to 104. The communication cable 106 is based on the IEEE 1394 standard (hereinafter called 1394 cable) and is capable of serially transferring the digital information outputted from each communication device.

Each device shown in FIG. 1 is provided in a memory thereof with device information (device name, kind of device and information on the functions of device) on own device. Such device information can be outputted in response to an inquiry command from other devices.

The 1394 network shown in FIG. 1 automatically executes bus resetting (resetting the connection configuration of the network recognized in the past and re-recognizing the new connection configuration of the network) in case of deleting a device from the network, adding a device thereto or turning on/off the power supply of a device connected to the network. The bus resetting allows the 1394 network to automatically set the ID information of each device, and each device on the 1394 network can automatically recognize the network configuration. Based on these functions, the 1394 network can always recognize the current configuration of the network.

Furthermore, the 1394 network has a function of relaying the data transferred from another device, and the devices can simultaneously understand the function status of the bus. Besides, the 1394 network has so-called plug-and-play function, by which a connected device can be automatically recognized by mere connection thereof, without turning off the power supply of the entire network.

The data transfer rate accommodatable in the 1394 network is 100/200/400 Mbps. A device of an upper transfer rate supports the lower transfer rate whereby communication is made possible between the devices of different transfer rates.

Furthermore, the 1394 network has two transfer modes, namely an asynchronous transfer mode for transferring data (control signals, file data etc.) that are required to be transferred in asynchronous manner whenever necessary, and an isochronous transfer mode for transferring data (video data, audio data etc.) that are required to be transferred in continuous manner at a fixed data rate. The asynchronous mode and the isochronous transfer mode can be present in a mixed manner within each communication cycle (generally 125 $\mu$s). Each communication cycle is executed after the transfer of a cycle start packet (CSP) indicating the start of a cycle. In each communication cycle, the isochronous transfer mode has a higher priority than the asynchronous transfer mode. Also the transfer band for the isochronous transfer mode is secured in each communication cycle, so that data of a predetermined amount can be transferred in continuous manner.

Figure 2:
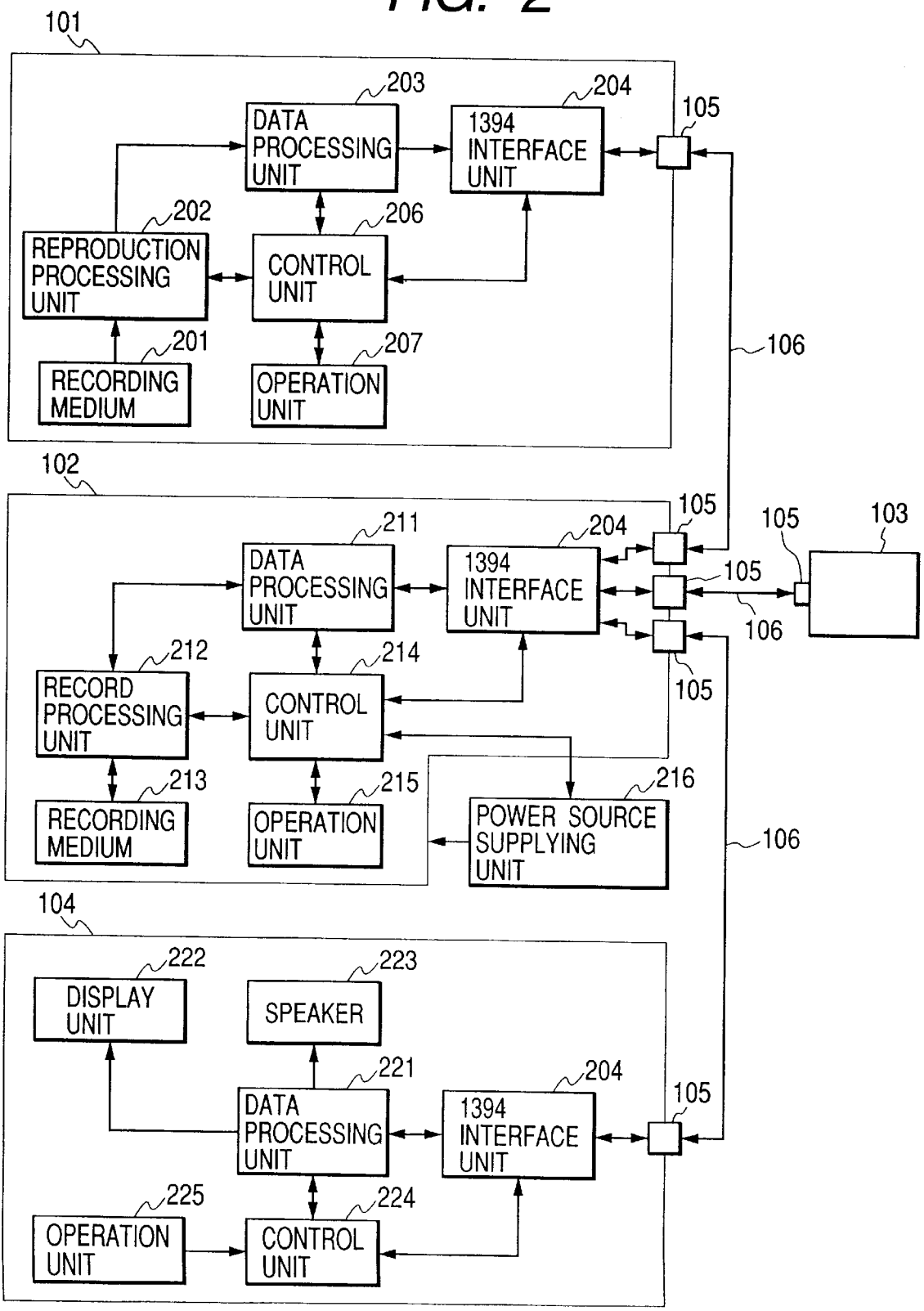
FIG. 2 is a block diagram showing the detailed configuration of a communication system constituting first to third embodiments.

FIG. 2 is a view showing the detailed configuration of the reproduction device 101, digital VDR-A 102 and TV monitor 104.

In the reproduction device 101, a recording medium 201 stored digital information (image, audio, data, text, graphic, program etc.) for which copying is inhibited, in a predetermined format (for example, MPEG for video and audio data). The recording medium 201 also records information whether copying of the digital information is inhibited (hereinafter called copy inhibiting information). A reproduction process unit 202 reads the digital information, together with the copy inhibiting information, from the recording medium 201. The digital information reproduced in the reproduction process unit 202 is supplied to a data process unit 203, while the copy inhibiting information is supplied to a control unit 206. There are also provided a data process unit 203 for converting the reproduced digital information into a format suitable for communication; 1 1394 interface unit 204 for packetizing the data output from the data process unit 203 into an isochronous transfer packet and executing isochronous transfer of each packet on a real-time basis based on a predetermined communication protocol (for example AV/C protocol); and a control unit 206 composed of a microcomputer and a memory capable recording predetermined program codes and adapted to control the functions of the various process units in the reproduction device 101. In particular, the control unit 206 detects, from the copy inhibiting information read from the recording medium, whether the copying is inhibited, and terminates the function of the reproduction process unit 203 according to the result of such detection. An operation unit 207 is used for entering operation commands from the user into the control unit 206.

In the digital VCR-A 102, there are provided a data process unit 211 for converting the digital data (image, audio data, text, graphic, program etc.), entered through the 1394 interface unit 204, into a format suitable for recording; a recording process unit 212 for recording the data, supplied from the data process unit 211, on a recording medium 213; a control unit 214 composed of a microcomputer and a memory capable of storing predetermined program codes and adapted to control the various process units of the digital VCR-A 102; an operation unit 215 for entering predetermined operation commands from the user into the control unit 214; and a power supply unit 216 for supplying power for driving various process units of the digital VCR-A 102. The power supply unit 216 can cut off all or a part of the power supply to the process units of the digital VCR-A 102, under the control of the control unit 214. In the present embodiment, the digital VCR-B 103 is constructed similar to the digital VCR-A 102.

In the TV monitor 104, there are provided a data process unit 221 for converting the digital data (image, audio data, text, graphic, program etc.), entered through the 1394 interface unit 204, into a format suitable for video or audio output; a monitor 222 capable of visually displaying image, text, graphics, warning message etc.; a speaker 223 capable of audio output of audio, alarm sound etc.; a control unit 224 composed of a microcomputer and a memory capable of storing predetermined program codes and adapted to control the functions of the process units in the TV monitor 104; and an operation unit 225 for entering predetermined operation commands from the user into the control unit 224.

In the communication system shown in FIG. 2, in case it is desired to transfer the digital information recorded on the recording medium 201 to the TV monitor 104 on real-time basis, the reproduction device 101 is required to output such digital information by the isochronous transfer mode.

On the 1394 network, the isochronous transfer packet from a device can be generally transferred to all the devices present on the network (namely broadcast). In such operation, the packet is given a predetermined channel number, and, by designating such channel number, each device on the network can receive the predetermined isochronous transfer packet and can display or record the digital information contained in such packet. In such configuration, however, the recording device connected to the network may unlawfully copy the isochronous transferred digital information.

Therefore, the first to third embodiments provide a 1394 network capable, in case of broadcasting of digital information for which the copying is inhibited, of preventing unlawful or erroneous recording of such digital information.

First Embodiment

Figure 3:
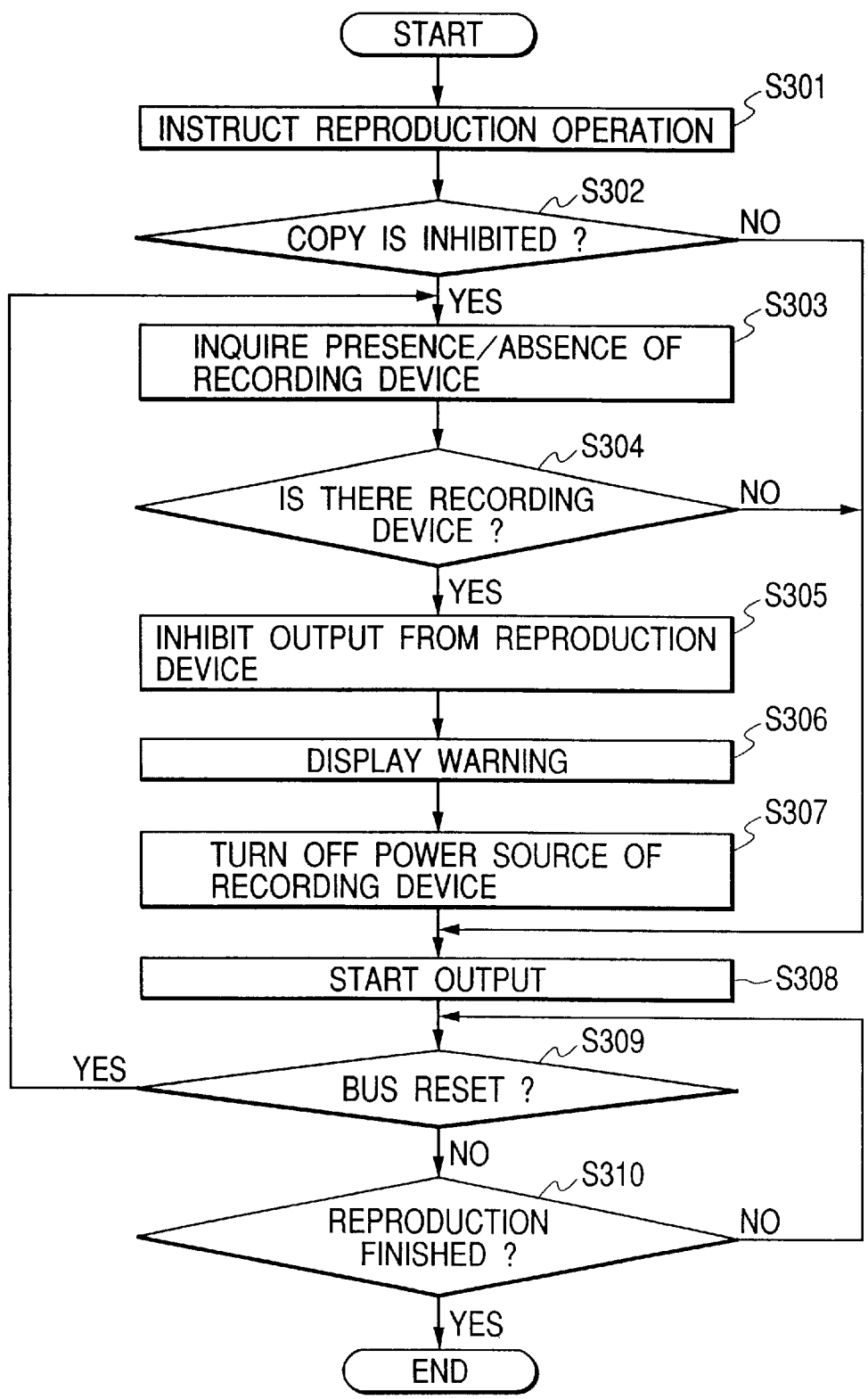
FIG. 3 is a flow chart showing the function of the communication system of the first embodiment.

In the following there will be explained, with reference to FIGS. 2 and 3, the process function of a communication system constituting the first embodiment. FIG. 3 is a flow chart showing the process thereof.

In case it is desired to isochronous transfer the digital information, recorded on the recording medium 201, to the TV monitor 104, the user manipulates the operation unit 207 to designate the reproduction of the recording medium 201 and to designate the TV monitor 104 as the destination of communication (step S301).

In response to the instruction for reproducing the recording medium 201, the reproduction process unit 202 reads the copy management (inhibiting) information recorded on the recording medium 201 and sends it to the control unit 206. The control unit 206 discriminates, from the copy management information, whether the copying of the digital information is inhibited (step S302). If the copying is not inhibited, the control unit 206 executes a process starting from a step S308.

If the step S302 identifies that the copying is inhibited, the control unit 206 inquires the device information to all the devices on the network, in order to discriminate whether a device capable of recording the digital information is present on the network (step S303). In the step S303, the control unit 206 generates a command (hereinafter called first command) for inquiring the device information (device name, kind of device, information on the functions thereof etc.) stored in the memory of each device, and sends the command to the 1394 interface unit 204, which packetizes the first command into an asynchronous packet and transfers it to all the devices.

Figure 4:
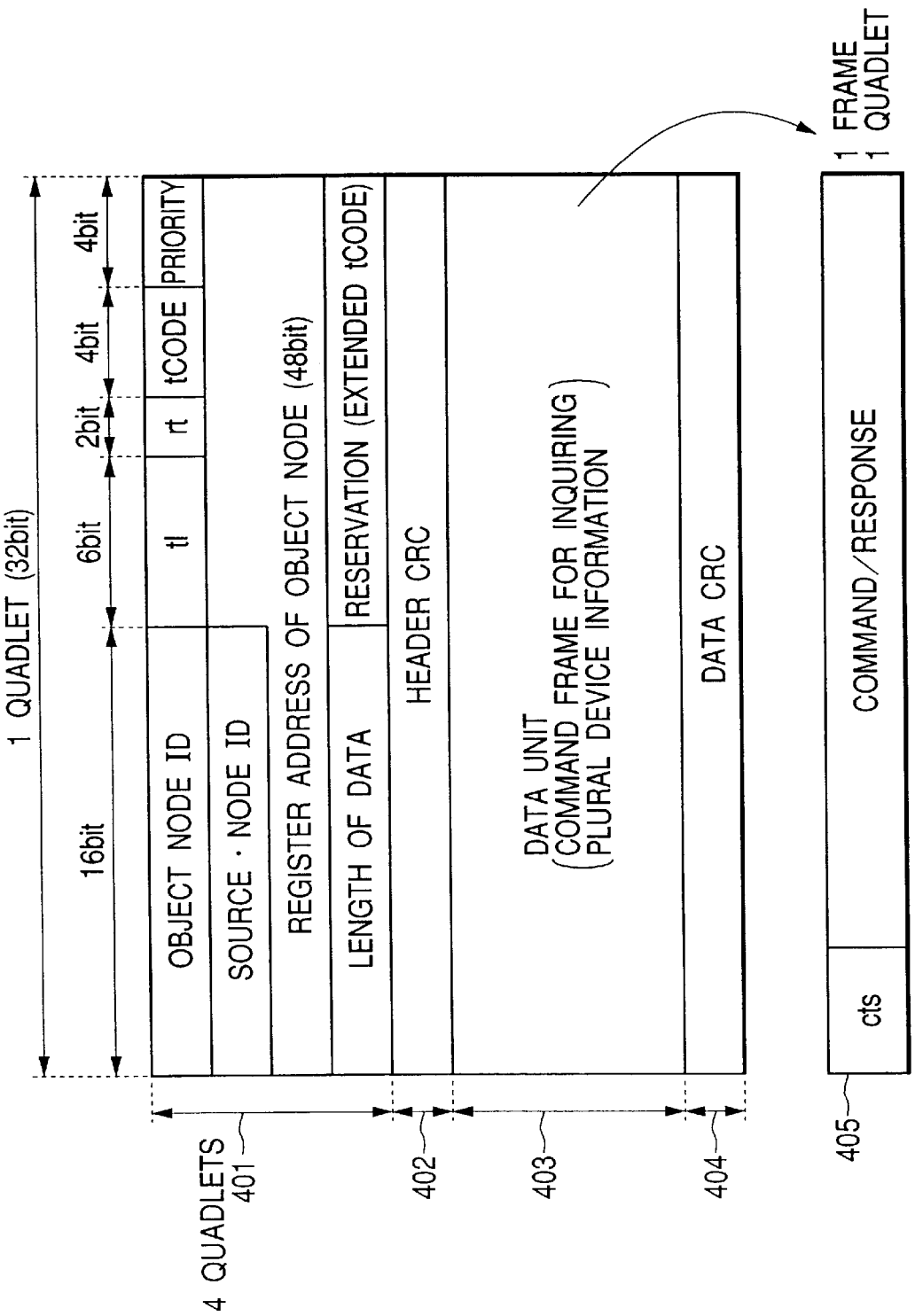
FIG. 4 is a view showing an example of the configuration of an asynchronous packet for asynchronous transfer of an inquiry command.

FIG. 4 shows an example of the configuration of the above-mentioned asynchronous packet. As shown in FIG. 4, the asynchronous packet is composed of a header portion 401, a heater CRC 402, a data portion 403, and a data CRC 404. The heater portion 401 has a field for storing an object node ID (node ID of the destination node), a source node ID (node ID of the packet sending node) and various control information. The asynchronous packet is usually transferred to a node indicated by the object node ID, but is broadcast if a code indicating broadcasting is written in the object node ID. The configuration of the asynchronous packet is common in all the embodiments. In the first embodiment, an asynchronous packet having a code indicating broadcasting in the object node ID and a first command 405 in the data portion 403 is generated and broadcast on the network.

Figure 5:
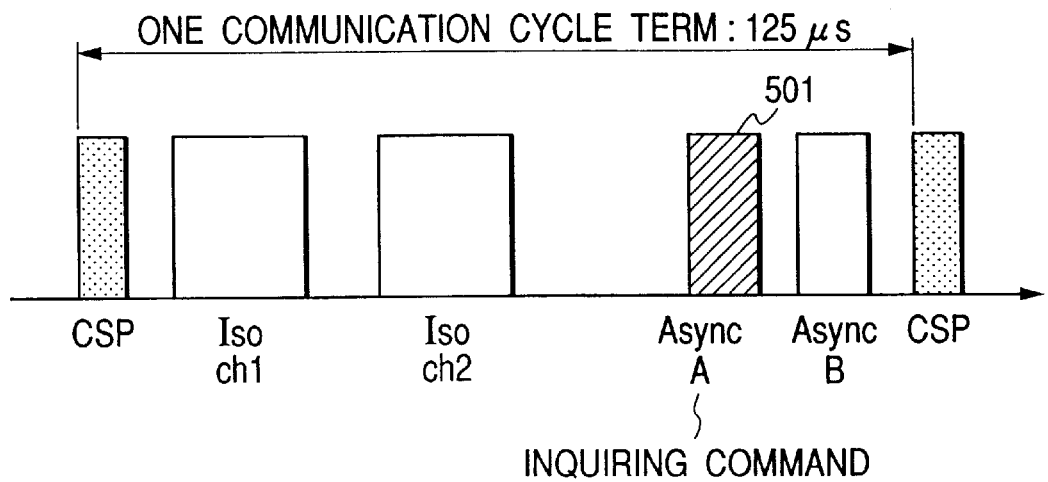
FIG. 5 is a view showing the timing of asynchronous transfer of an inquiry command.

FIG. 5 shows an example of the timing of transfer of the inquiry command within a communication cycle time, wherein 501 indicates the asynchronous packet (including the first command 405) shown in FIG. 4. As shown in FIG. 5, the asynchronous transfer mode has a lower priority than the isochronous transfer mode within a communication cycle, and can be started after a predetermined gap time from the end of the isochronous transfer mode.

The control unit 206 of the reproduction device 101 receives the responses (namely device information of the devices) to the first command, from the 1394 interface unit 204, and stores each response, together with the node ID of each device, in the memory provided in the control unit 206. Then, based on the device information of the devices, it discriminates whether a device capable of recording the digital information (hereinafter called recording device) is present on the network (step S304).

If the step S304 identifies that the recording device is absent on the network, the control unit 206 executes a process starting from a step S308.

On the other hand, if the step S304 identifies that the recording device (digital VCR-A 102 and VCR-B 103 in the present embodiment) is present on the network, the control unit 206 so controls the reproduction process unit 202 as to interrupt the reproduction of the digital information (step S305). In response, the external output of the digital information is terminated.

Figure 6:
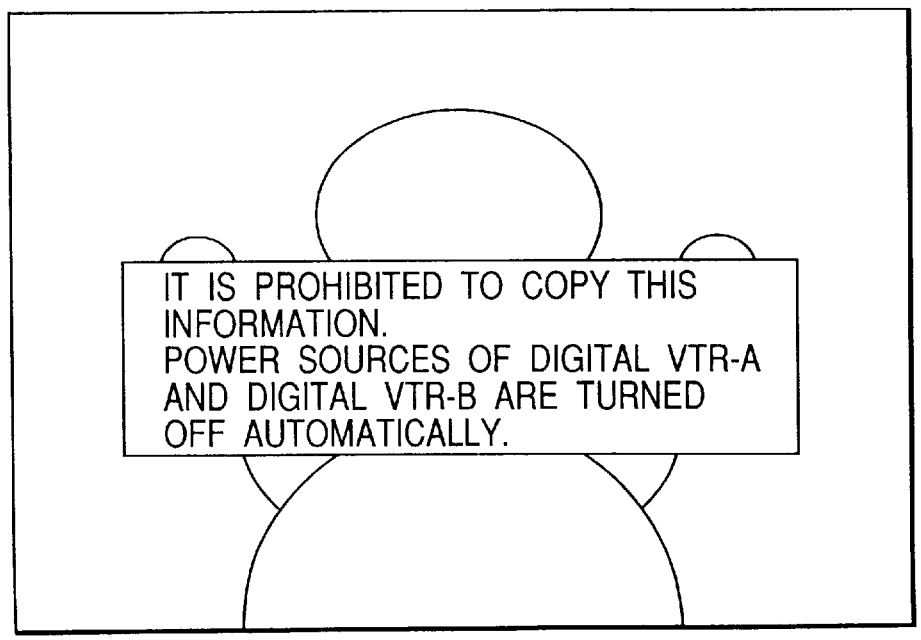
FIG. 6 is a view showing an example of the image frame displayed on a TV monitor 104.

Also, the control unit 206 supplies the 1394 interface unit 204 with information indicating termination of reproduction and device information of the recording device. The 1394 interface unit 204 executes asynchronous transfer of a packet containing these information to the TV monitor 104, which, in response, displays an image or a message, for example, "Copying of this information is inhibited. The power supply of the digital VCR-A, VCR-B is automatically turned off" on the display unit 222 (step S306). FIG. 6 shows an example of the image displayed on the display unit 222 of the TV monitor 104.

After the transfer of the packet containing the information indicating termination of reproduction and the device information of the recording device to the TV monitor 104, the control unit 206 generates a command for turning off the power supply of the digital VCR-A 102 and the digital VCR-B 103, and executes asynchronous transfer of such packet to the recording devices (102, 103) through the 1394 interface unit 204. In response, the recording devices (102, 103) control the power supply unit 216 to automatically turn off the power supplied thereto in such a manner that the 1394 interface unit 204 functions only as a repeater (step S307).

The control unit 206 supplies the electric power only to a part of the 1394 interface unit 204 so as to only activate the physical layer of the 1394 interface unit 204, whereby the recording devices (102, 103) can exactly execute only relaying of the packet transferred through the network, but cannot enter the packet into the recording device itself. Consequently the recording devices (102, 103) become incapable of receiving the isochronous transferred digital information and the unlawful copying thereof can be prevented. Since the physical layer alone of the 1394 interface unit 204 is activated, the connection configuration of the network remains unchanged even though the power supply of the recording devices is turned off. As a result, there is not executed the bus resetting mentioned in the foregoing, and there is not encountered the interruption of communication resulting from such bus resetting.

After the step S302, S304 or S307, the control unit 206 so controls the reproduction process unit 202 as to reproduce the digital information recorded on the recording medium 201. The reproduced digital information is divided in the data process unit 203 into packet data of a predetermined data amount, which are supplied in succession to the 1394 interface unit 204. The 1394 interface unit 204 packetizes each packet data into an isochronous packet having a predetermined channel number. Then the isochronous packets are broadcast in succession in successive communication cycles (step S308). The TV monitor 104 receives the packets which are isochronous transferred from the reproduction device 101 and outputs the digital information, constituted by the received packets, through the display unit 222 and the speaker 223.

The reproduction device 101 detects whether the bus resetting (namely change in the connection configuration of the network by addition or deletion of device to or from the network, power on/off of the devices etc.) has been generated in the period of isochronous transfer of the digital information mentioned above (step S309), and, if the bus resetting is detected, the network of the present first embodiment executes initialization of the network configuration and recognition of the new connection configuration. During this operation, the reproduction device 101 interrupts the reproduction of the recording medium 201 and the transfer of the reproduced digital information.

After the recognition of the new network configuration, the reproduction device 101 again executes the procedure starting from the step S303, thereby re-starting the reproduction and transfer interrupted by the bus resetting. Thus, if a new recording device is connected to the network during the output of the copy-inhibited digital information to the network, the connection of such recording device can be detected by the bus resetting. Also the power supply for such recording device can be turned off to prevent unlawful copying. The bus resetting can be detected by a change in the bias voltage supplied by each device, present on the network, to the network. The initialization of the network and the recognition of the connection configuration, following the bus resetting, are executed according to a procedure based on the IEEE 1394 standard.

The control unit 206 continues the isochronous transfer of the digital information until the reproduction thereof is completed (step S310). When the reproduction of the digital information is completed, the control unit 206 transfers a command, for informing the user of the completion of reproduction, to the TV monitor 104, which, in response, outputs a message such as "Reproduction is completed" by the display unit 222 or the speaker 223, thereby informing the user of the completion of reproduction of the digital information.

In the first embodiment, the system may also be so constructed as to display a message such as "Copying of this information is inhibited. Turn off the power of the digital VCR-A and the digital VCR-B before reproduction" on the display unit 222 and to request that the user himself turns off the power supply of the relevant devices. In such case, the communication interface of each recording device of which power supply is turned off merely functions as a repeater as explained in the foregoing. Also the reproduction device 101 does not output the digital information until the turning-off of the power supply in the recording devices is confirmed. Therefore, the connection configuration of the network remains unchanged even when the power supply to the recording devices is turned off.

In the first embodiment, there has been explained a configuration capable of automatically turning off the power supply to the recording device, and causing such device to merely function as a repeater thereby inhibiting the recording of the digital information. The first embodiment may however be so constructed as not to turn off the power supply of the recording device but cause the 1394 interface unit 204 thereof to merely function as a repeater. In such case, the 1394 interface unit 204 of each recording device can relay the digital information transferred through the network but cannot enter such digital information into the recording device. Therefore, each recording device executes a process independently from the network and is incapable of unlawfully copying the digital information present on the network.

As explained in the foregoing, in the first embodiment, in case of broadcasting the copy-inhibited digital information, the reproduction device 101 determines whether the output thereof is permitted or not, according to whether a recording device is present on the network. In case the recording device is present, the digital information is outputted after such recording device is made to merely function as a repeater. Thus the reproduction device 101 can prevent unlawful or erroneous copying by the recording device present on the network, thereby protecting the copyright of the digital information.

In the first embodiment, the device information (device name, kind of device, information on the functions thereof etc.) of the devices is inquired by the asynchronous transfer of an inquiry command, but such inquiry can be made by the isochronous transfer.

Figure 7:
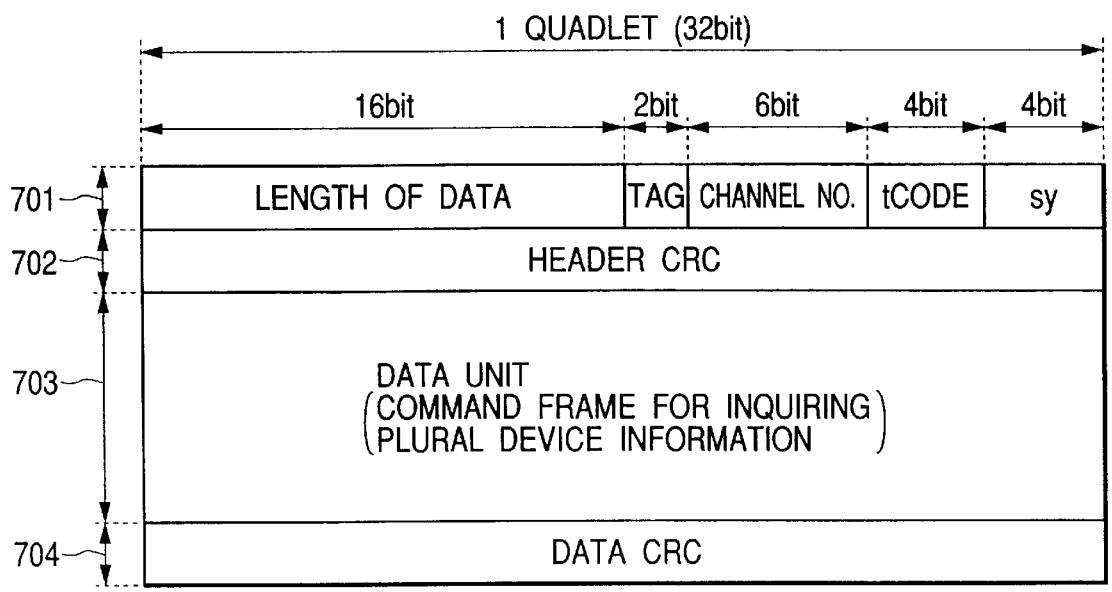
FIG. 7 is a view showing an example of the configuration of an isosynchronous packet for isosynchronous transfer of an inquiry command.

As shown in FIG. 7, the isochronous packet is composed of a header portion 701, a heater CRC 702, a data portion 703, and a data CRC 704. The header portion 701 has a field for storing a channel number (a number given to a band capable of transferring the isochronous packet and the isochronous packet outputted from each device is distinguished by this number) and various control information. The isochronous packet, being transferred by this channel number, is not addressed to a specified node but is broadcast over the entire network. Consequently each node can receive the predetermined isochronous packet by detecting the channel number. In the present case, the reproduction device 101 generates an isochronous packet, storing the above-mentioned inquiry command in the data portion 703, and broadcasts the packet with a predetermined channel number.

Figure 8:
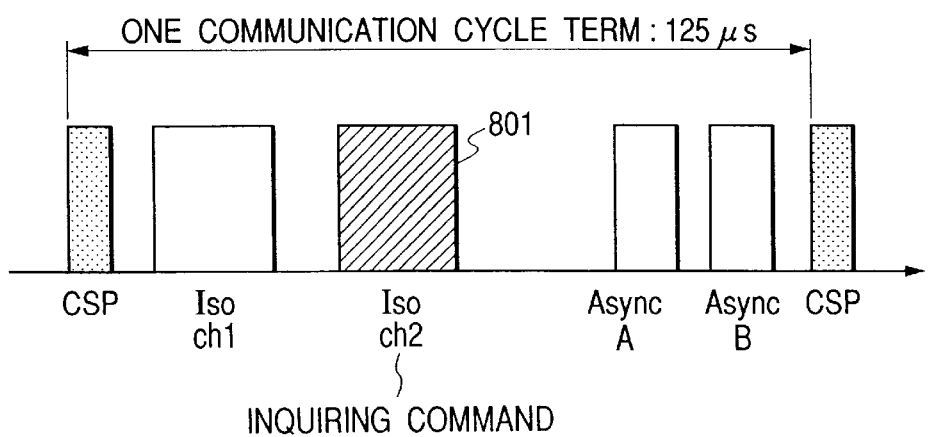
FIG. 8 is a view showing the timing of isosynchronous transfer of an inquiry command.

FIG. 8 shows an example of the transfer timing of the inquiry command within a communication cycle time. In FIG. 8, 801 indicates the isochronous packet shown in FIG. 7 (containing inquiry command), broadcast with a channel number "ch2". As shown in FIG. 8, within a communication cycle, the isochronous transfer mode has a higher priority than the asynchronous transfer mode. The isochronous transfer mode ensures the transfer of data of a predetermined amount within each communication cycle time.

Second Embodiment

In the first embodiment, there has been explained a configuration in which, in case a recording device is present on the network, the 1394 interface of such recording device merely functions as a repeater. In the second embodiment, there will be explained a configuration in which an inquiry is made to the recording device present on the network whether it has a recording medium, and the output of the digital information is controlled according to the response to such inquiry.

Figure 9:
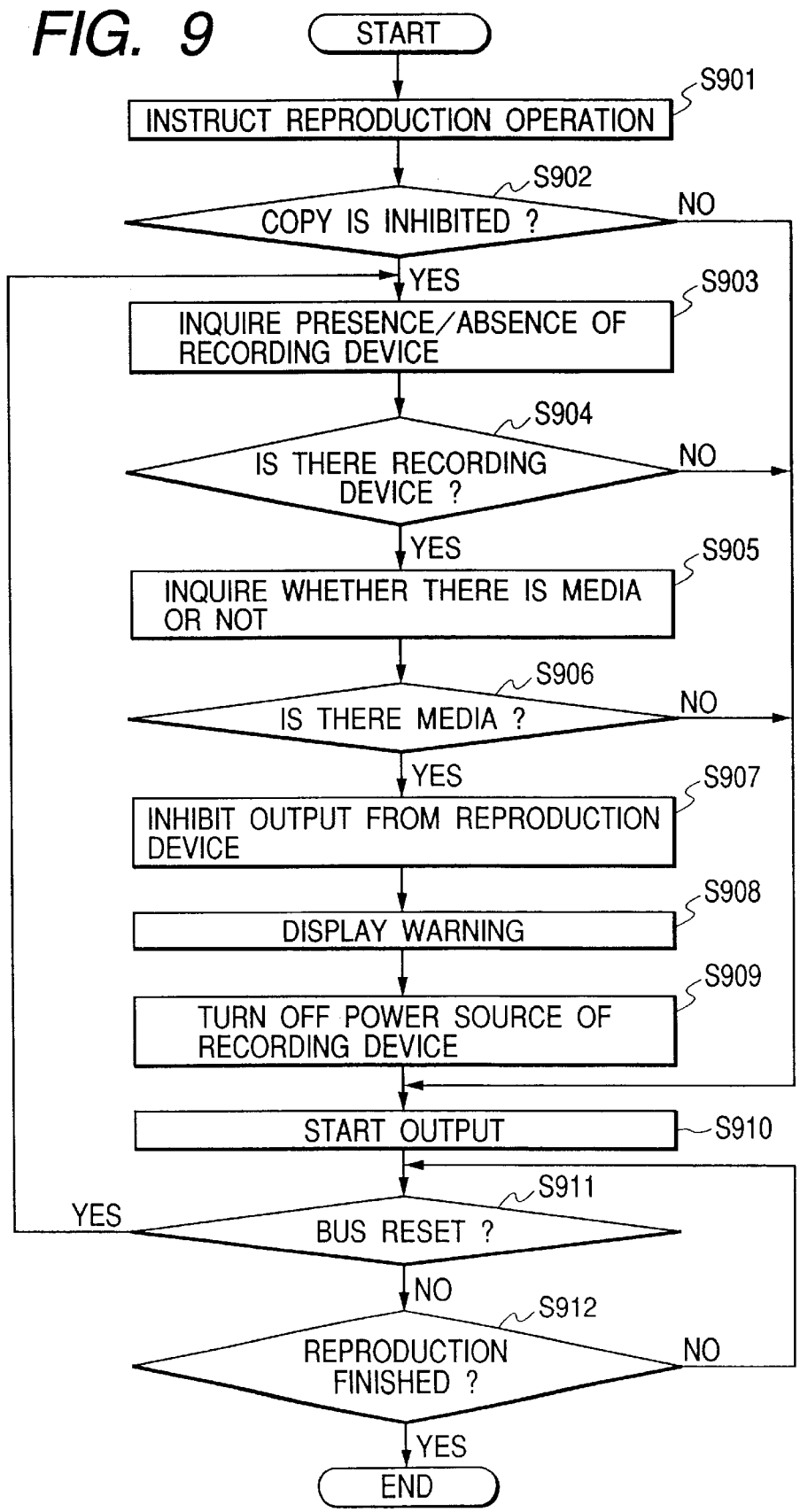
FIG. 9 is a flow chart showing the function of the communication system of the second embodiment.

FIG. 9 is a flow chart showing the operation sequence of a communication system constituting the second embodiment.

Referring to FIG. 9, in case it is desired to execute isochronous transfer of the digital information, recorded on the recording medium 201, to the TV monitor 104, the user manipulates the operation unit 207 of the reproduction device 101 to instruct the reproduction of the digital information of the recording medium 201 (step S901).

In response to the instruction of reproduction of the recording medium 201, the reproduction process unit 202 reads the copy management information recorded on the recording medium 201 and sends such information to the control unit 206. Based on the copy management information, the control unit 206 discriminates whether the copying of the digital information is inhibited (step S902). If the copying is not inhibited, the control unit 206 executes a process starting from a step S910.

If the step S902 identifies that the copying is inhibited, the control unit 206 inquires the device information of the devices on the 1394 network, in order to discriminate whether a recording device is present on the network (step S903). In the step S903, the control unit 206 generates the aforementioned first inquiry command and sends it to the 1394 interface unit 204, which packetizes the first command into an asynchronous packet shown in FIG. 4 and transfers it to the devices.

The control unit 206 of the reproduction device 101 receives the responses (device information of the devices) to the inquiry to the devices, from the 1394 interface unit 204, and stores the device information together with the node ID of each device in the memory provided in the control unit 206. Based on the device information of the devices, the control unit discriminates whether the recording device is present on the network (step S904).

If the result of the step S904 identifies that the recording device is absent on the network, the control unit 206 executes a process starting from a step S910.

On the other hand, if the result of the step S904 identifies that the recording device (digital VCR-A 102 and digital VCR-B 103 as in the first embodiment) is present on the network, the control unit 206 generates a command (hereinafter called second command) for inquiring to such recording device whether a recording medium is provided therein and sends the second command to the 1394 interface unit 204. The 1394 interface unit 204 packetizes the second command into an asynchronous packet and transfers it to the recording device (step S905).

The 1394 interface unit 204 of the reproduction device 101 receives the response to the second command and stores the response together with the aforementioned device information in the memory provided in the control unit 206. Based on this response, the control unit 206 discriminates whether each recording device is provided with the recording medium (step S906).

If the result of the step S906 identifies that at least one of the recording devices (digital VCR-A 102 and digital VCR-B 103) is provided with the recording medium, the control unit 206 so controls the reproduction process unit 202 as to terminate the reproduction of the digital information (step S907). The output of the digital information is terminated by this process.

In addition, the control unit 206 sends information indicating the termination of reproduction and the device information of the recording device to the 1394 interface unit 204, which executes asynchronous transfer of a packet, containing these information, to the TV monitor 104. In response, the TV monitor 104 displays a warning by an image or a message, for example, "Copying of this information is inhibited. The power supply of the digital VCR-A and VCR-B is automatically turned off." on the display unit 222 (step S908).

On the other hand, if the result of the step S906 identifies that the recording device containing the recording medium is absent on the network, the production device 101 executes the process starting from the step S910.

After the transfer of the packet containing the information indicating termination of reproduction and the device information of the recording device to the TV monitor 104, the control unit 206 generates a command for turning off the power supply of the digital VCR-A 102 and the digital VCR-B 103, and executes asynchronous transfer of such packet to the recording devices (102, 103) through the 1394 interface unit 204. In response, the recording devices (102, 103) control the power supply unit 216 to automatically turn off the power supplied thereto in such a manner that the 1394 interface unit 204 functions only as a repeater (step S909).

The control unit 206 supplies the electric power only to a part of the 1394 interface unit 204 so as to only activate the physical layer of the 1394 interface unit 204, whereby the recording devices (102, 103) can exactly execute only relaying of the packet transferred through the network, but cannot enter the packet into the recording device itself. Consequently the recording devices (102, 103) become incapable of receiving the isochronous transferred digital information and the unlawful or erroneous copying thereof can be prevented. Since the physical layer alone of the 1394 interface unit 204 is activated, the connection configuration of the network remains unchanged even though the power supply of the recording devices is turned off. As a result, there is not executed the bus resetting mentioned in the foregoing, and there is not encountered the interruption of communication resulting from such bus resetting.

After the step S902, S904, S906 or S909, the control unit 206 so controls the reproduction process unit 202 as to reproduce the digital information recorded on the recording medium 201. The reproduced digital information is divided in the data process unit 203 into packet data of a predetermined data amount, which are supplied in succession to the 1394 interface unit 204. The 1394 interface unit 204 packetizes each packet data into an isochronous packet having a predetermined channel number. Then the isochronous packets are broadcast in succession in successive communication cycles (step S910). The TV monitor 104 receives the packets which are isochronous transferred from the reproduction device 101 and outputs the digital information, constituted by the received packets, through the display unit 222 and the speaker 223.

The reproduction device 101 detects whether the bus resetting has been generated in the period of isochronous transfer of the digital information mentioned above (step S911), and, if the bus resetting is detected, the network of the present second embodiment executes initialization of the network configuration and recognition of the new connection configuration. During this operation, the reproduction device 101 interrupts the reproduction of the recording medium 201 and the transfer of the reproduced digital information.

After the recognition of the new network configuration, the reproduction device 101 again executes the procedure starting from the step S903, thereby re-starting the reproduction and transfer interrupted by the bus resetting. Thus, if a new recording device is connected to the network during the output of the copy-inhibited digital information to the network, the connection of such recording device can be detected by the bus resetting. Also the power supply for such recording device can be turned off to prevent unlawful copying. The recording device of the second embodiment is so constructed, in case the recording medium is loaded in the course of transfer of the aforementioned digital information, to request the bus resetting to the network. Therefore even if the recording medium is loaded in the recording device that has not contained the recording medium, in the course of output of the copy-inhibited digital information to the network, such digital information cannot be copied.

The control unit 206 continues the isochronous transfer of the digital information until the reproduction thereof is completed (step S912). When the reproduction of the digital information is completed, the control unit 206 transfers a command, for informing the user of the completion of reproduction, to the TV monitor 104, which, in response, outputs a message such as "Reproduction is completed" by the display unit 222 or the speaker 223, thereby informing the user of the completion of reproduction of the digital information.

In the second embodiment, as in the first embodiment, the system may also be so constructed as to display a message such as "Copying of this information is inhibited. Turn off the power of the digital VCR-A and the digital VCR-B before reproduction" on the display unit 222 and to request that the user himself turns off the power supply of the relevant devices.

In the second embodiment, there has been explained a configuration capable of automatically turning off the power supply to the recording device, and causing such device to merely function as a repeater thereby inhibiting the recording of the digital information. The second embodiment may however be so constructed as to not to turn off the power supply of the recording device but cause the 1394 interface unit 204 thereof to merely function as a repeater.

As explained in the foregoing, in the second embodiment, in case of broadcasting the copy-inhibited digital information on the network, the reproduction device 101 determines the output thereof, according to whether a recording device is present on the network and also according to whether the recording device is provided with a recording medium. In case the recording device having the recording medium is present on the network, the digital information is outputted after such recording device is made to merely function as a repeater. Thus the reproduction device 101 can prevent unlawful or erroneous copying by the recording device present on the network, thereby protecting the copyright of the digital information.

Third Embodiment

In the first embodiment, there has been explained a configuration in which, in case a recording device is present on the network, the 1394 interface of such recording device is caused to merely function as a repeater. In the second embodiment, there has been explained a process of further inquiring, to the recording device present on the network, whether it is provided with the recording medium and controlling the output of the digital information according to the response to the inquiry.

In the third embodiment, there will be explained a process, after the inquiry is made to the recording device present on the network whether it has a recording medium, of causing the recording device having the recording medium to eject such recording medium and causing the 1394 interfaces of other recording devices to merely function as repeaters.

Figure 10:
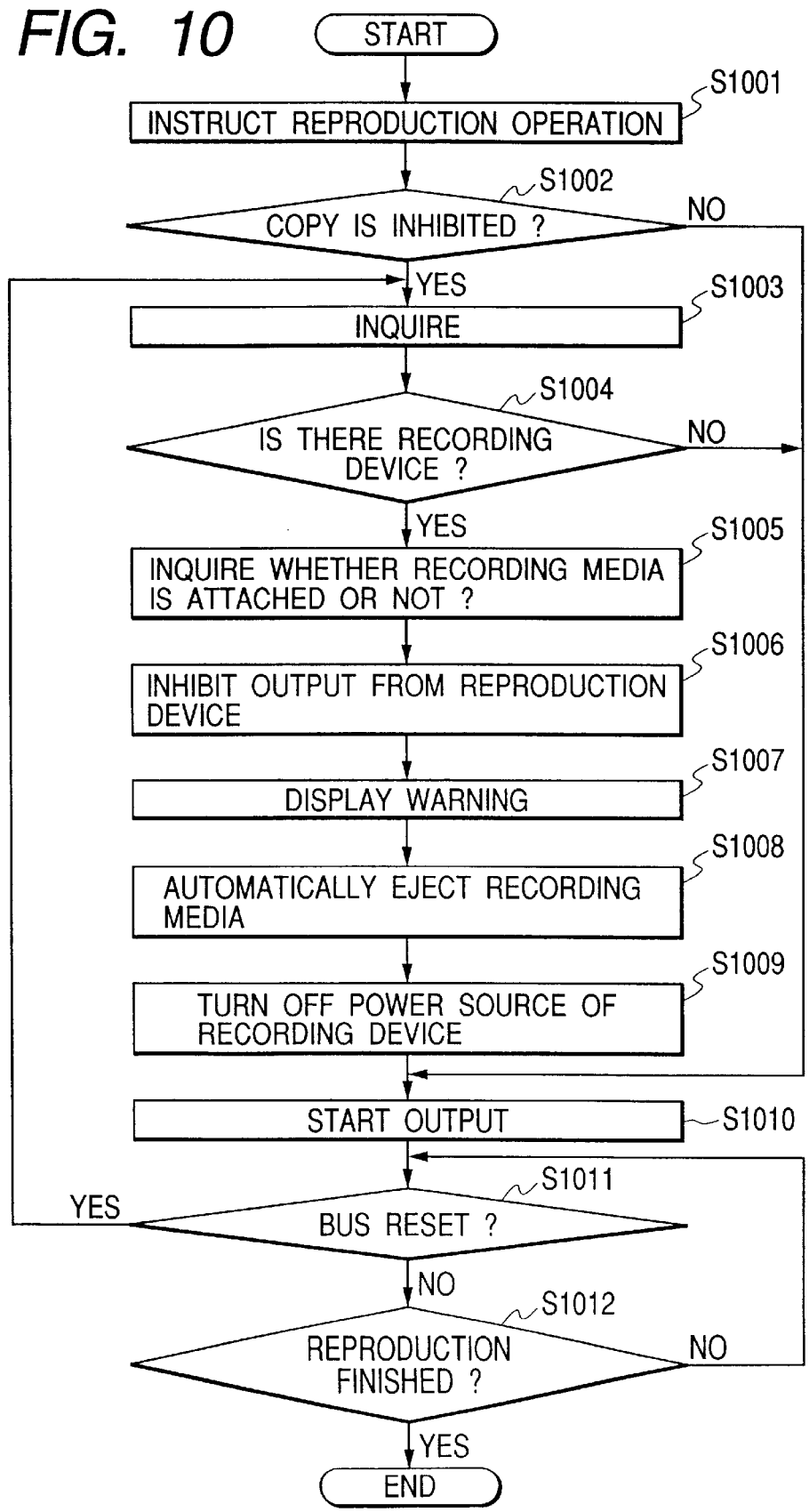
FIG. 10 is a flow chart showing the function of the communication system of the third embodiment.

FIG. 10 is a flow chart showing the operation sequence of a communication system constituting the third embodiment.

Referring to FIG. 10, in case it is desired to execute isochronous transfer of the digital information, recorded on the recording medium 201, to the TV monitor 104, the user manipulates the operation unit 207 of the reproduction device 101 to instruct the reproduction of the digital information of the recording medium 201 (step S1001).

In response to the instruction of reproduction of the recording medium 201, the reproduction process unit 202 reads the copy management information recorded on the recording medium 201 and sends such information to the control unit 206. Based on the copy management information, the control unit 206 discriminates whether the copying of the digital information is inhibited (step S1002). If the copying is not inhibited, the control unit 206 executes a process starting from a step S1010.

If the result of the step S1002 identifies that the copying is inhibited, the control unit 206 inquires the device information of the devices on the 1394 network, in order to discriminate whether a recording device is present on the network (step S1003). In the step S1003, the control unit 206 generates the aforementioned first command and sends it to the 1394 interface unit 204, which packetizes the first command into an asynchronous packet shown in FIG. 4 and transfers it to the devices.

The control unit 206 of the reproduction device 101 receives the responses (device information of the devices) to the inquiry to the devices, from the 1394 interface unit 204, and stores the device information together with the node ID of each device in the memory provided in the control unit 206. Based on the device information of the devices, the control unit discriminates whether the recording device is present on the network (step S1004).

If the result of the step S1004 identifies that the recording device is absent on the network, the control unit 206 executes a process starting from a step S1010.

On the other hand, if the result of the step S1004 identifies that the recording device (digital VCR-A 102 and digital VCR-B 103 as in the first embodiment) is present on the network, the control unit 206 generates the aforementioned second command and sends it to the 1394 interface unit 204. The 1394 interface unit 204 packetizes the second command into an asynchronous packet and transfers it to the recording device (step S1005).

The 1394 interface unit 204 of the reproduction device 101 receives the response to the second command and stores the response together with the aforementioned device information in the memory provided in the control unit 206. Based on this response, the control unit 206 discriminates whether each recording device is provided with the recording medium. In case it is identified that the recording device is provided with the recording medium, the control unit 206 so instructs the reproduction process unit 203 to terminate the reproduction of the digital information (step S1006). The output of the digital information is terminated by this process.

For example, if the digital VCR-A 102 is provided with the recording medium but the digital VCR-B 103 is not provided with the recording medium, the control unit 206 sends information indicating the termination of reproduction and the device information of the recording device provided with the recording medium to the 1394 interface unit 204, which executes asynchronous transfer of a packet, containing these information, to the TV monitor 104. In response, the TV monitor 104 displays a warning by an image or a message, for example, "Copying of this information is inhibited. The recording medium of the digital VCR-A is ejected. The power supply of the digital VCR-B is automatically turned off." on the display unit 222 (step S1007).

After the step S1007, the control unit 206 generates a command for ejecting the recording medium of the digital VCR-A 102, and executes asynchronous transfer of such command to the digital VCR-A 102 through the 1394 interface unit 204. In response, the digital VCR-A 102 automatically ejects the recording medium (step S1008). Thus the digital VCR-A 102 becomes incapable of recording the digital information even if it is received through the network, whereby the unlawful or erroneous copying of the digital information can be prevented.

Also the control unit 206 generates a command for turning off the power supply of the digital VCR-B 103, and executes asynchronous transfer of such command to the digital VCR-B 103 through the 1394 interface unit 204. In response, the digital VCR-B 103 so controls the power supply unit 216 as to automatically turn off the power supply to the digital VCR-B in such a manner that the 1394 interface unit 204 merely functions as a repeater (step S1009).

The control unit 206 supplies the electric power only to a part of the 1394 interface unit 204 so as to only activate the physical layer of the 1394 interface unit 204, whereby the digital VCR-B 103 can exactly execute only relaying of the packet transferred through the network, but cannot enter the packet into the recording device itself. Consequently the digital VCR-B 103 becomes incapable of receiving the isochronous transferred digital information and the unlawful or erroneous copying thereof can be prevented. Since the physical layer alone of the 1394 interface unit 204 is activated, the connection configuration of the network remains unchanged even though the power supply of the recording device is turned off. As a result, there is not executed the bus resetting mentioned in the foregoing, and there is not encountered the interruption of communication resulting from such bus resetting.

After the step S1002, S1004 or S1009, the control unit 206 so controls the reproduction process unit 202 as to reproduce the digital information recorded on the recording medium 201. The reproduced digital information is divided in the data process unit 203 into packet data of a predetermined data amount, which are supplied in succession to the 1394 interface unit 204. The 1394 interface unit 204 packetizes each packet data into an isochronous packet having a predetermined channel number. Then the isochronous packets are broadcast in succession in successive communication cycles (step S1010). The TV monitor 104 receives the packets which are isochronous transferred from the reproduction device 101 and outputs the digital information, constituted by the received packets, through the display unit 222 and the speaker 223.

The reproduction device 101 detects whether the bus resetting has been generated in the period of isochronous transfer of the digital information mentioned above (step S1011), and, if the bus resetting is detected, the network of the third embodiment excecutes initialization of the network configuration and recognition of the new connection configuration. During this operation, the reproduction device 101 interupts the reproduction of the recording medium 201 and the transfer of the reproduced digital information.

After the recognition of the new network configuration, the reproduction device 101 again executes the procedure starting from the step S1003, thereby re-starting the reproduction and transfer interrupted by the bus resetting. Thus, if a new recording device is connected to the network during the output of the copy-inhibited digital information to the network, the connection of such recording device can be detected by the bus resetting. Also the power supply for such recording device can be turned off to prevent unlawful or erroneous copying. The recording device of the third embodiment is so constructed, in case the recording medium is loaded in the course of transfer of the aforementioned digital information, to request the bus resetting to the network. Therefore, even if the recording medium is loaded in the recording device that has not contained the recording medium, in the course of output of the copy-inhibited digital information to the network, such digital information cannot be copied.

The control unit 206 continues the isochronous transfer of the digital information until the reproduction thereof is completed (step S1012). When the reproduction of the digital information is completed, the control unit 206 transfers a command, for informing the user of the completion of reproduction, to the TV monitor 104, which, in response, outputs a message such as "Reproduction is completed" by the display unit 222 or the speaker 223, thereby informing the user of the completion of reproduction of the digital information.

In the third embodiment, the system may also be so constructed as to display a message such as "Copying of this information is inhibited. Eject the recording medium or turn off the power of the digital VCR-A and the digital VCR-B before reproduction" on the display unit 222 and to request that the user himself ejects the recording medium and turns off the power supply of the relevant devices.

In the third embodiment, there has been explained a configuration capable of automatically turning off the power supply to the recording device, and causing such device to merely function as a repeater thereby inhibiting the recording of the digital information. The third embodiment may however be so constructed, as in the first embodiment, as not to turn of f the power supply of the recording device but cause the 1394 interface unit 204 thereof to merely function as a repeater.

As explained in the foregoing, in the third embodiment, in case of broadcasting the copy-inhibited digital information on the 1394 network, the reproduction device 101 permits or not the output thereof, according to whether a recording device is present on the network and also according to whether the recording device is provided with the recording medium. Thus the digital information is outputted after the ejection of the recording medium if the recording device, having the recording medium, is present on the network, and after the recording device is caused to function as the repeater if the recording device without the recording medium is present on the network. Thus the reproduction device 101 can prevent unlawful or erroneous copying by the recording device present on the network, thereby protecting the copyright of the digital information.

In the following there will be explained fourth to sixth embodiments.

Figure 11:
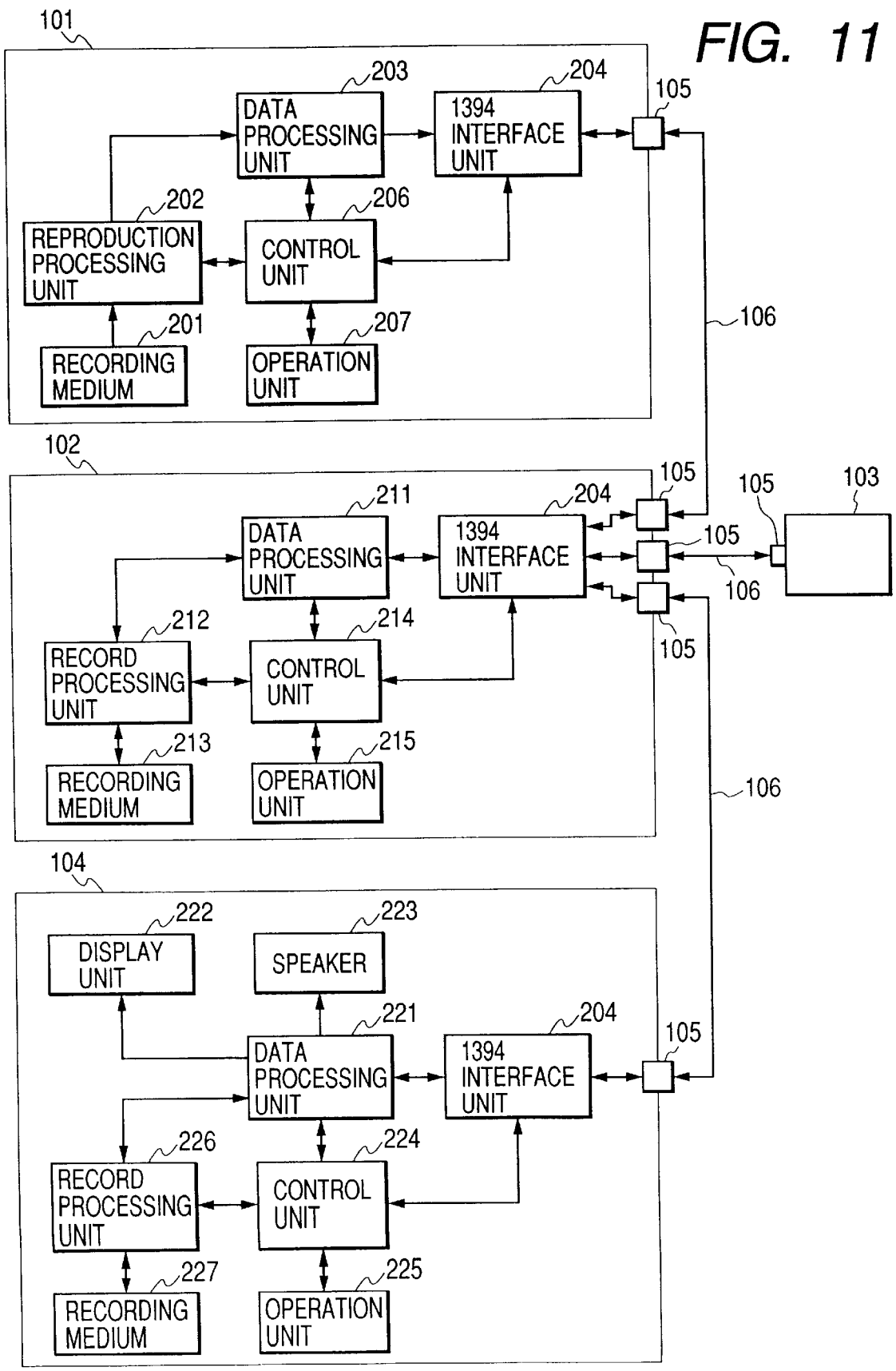
FIG. 11 is a block diagram showing the detailed configuration of a communication system constituting fourth to sixth embodiments.

FIG. 11 is a view showing the detailed configuration of the reproduction device 101, digital VCR-A 102 and TV monitor 104. In the following the fourth to sixth embodiments will be explained with reference to FIG. 11, in which components equivalent to those in FIG. 2 are represented by corresponding numbers.

At first, in the reproduction device 101, a recording medium 201 stores digital information (image, audio data, text, graphic, program etc.) for which copying is inhibited, in a predetermined format (for example MPEG for video and audio data). The recording medium 201 also records information whether copying of the digital information is inhibited (hereinafter called copy inhibiting information). A reproduction process unit 202 reads the digital information, together with the copy inhibiting information, from the recording medium 201. The digital information reproduced in the reproduction process unit 202 is supplied to a data process unit 203, while the copy inhibiting information is supplied to a control unit 206. There are also provided a data process unit 203 for converting the reproduced digital information into a format suitable for communication; a 1394 interface unit 204 for packetizing the data output from the data process unit 203 into an isochronous transfer packet and executing isochronous transfer of each packet on real-time basis based on a predetermined communication protocol (for example AV/C protocol); and a control unit 205 composed of a microcomputer and a memory capable of recording predetermined program codes and adapted to control the functions of the various process units in the reproduction device 101. In particular, the control unit 205 detects, from the copy inhibiting information read from the recording medium, whether the copying is inhibited, and terminates the function of the reproduction process unit 203 according to the result of such detection. An operation 206 is used for entering operation commands from the user into the control unit 205.

In the digital VCR-A 102, there are provided a data process unit for converting the digital data (image, audio data, text, graphic, program etc.), entered through the 1394 interface unit 204, into a format suitable for recording; a recording process unit 212 for recording the data, supplied from the data process unit 211, on a recording medium 213; a control unit 214 composed of a microcomputer and a memory capable of storing predetermined program codes and adapted to control the various process units of the digital VCR-A 102; and an operation unit 215 for entering predetermined operation commands from the user into the control unit 214. In the present embodiment, the digital VCR-B 103 is constructed similar to the digital VCR-A 102.

In the TV monitor 104, there are provided a data process unit 221 for converting the digital data (image, audio data, text, graphic, program etc.) entered through the 1394 interface unit 204, into a format suitable for video or audio output; a monitor 222 capable of visually displaying image, text, graphics, warning message etc.; a speaker 223 capable of audio output of audio, alarm sound etc.; a recording process unit 226 for converting the data supplied from the data process unit 221 into a format recordable on a recording medium 227 (for example a magnetic disk or a magnetooptical disk) and recording thus converted data; and a control unit 224 composed of a microcomputer and a memory capable of storing predetermined program codes and adapted to control the functions of the process units in the TV monitor 104. In particular, the control unit 224 so controls as to terminate or suspend the recording operation of the recording process unit 226 according to command information entered from the 1394 interface unit 204. An operation unit 225 is used for entering predetermined operation commands from the user into the control unit 224.

In the communication system shown in FIG. 11, in case it is desired to transfer the digital information recorded on the recording medium 201 to the TV monitor 104 on real-time basis, the reproduction device 101 outputs such digital information by the isochronous transfer mode, as in the first to third embodiments.

As explained in the following, the fourth to sixth embodiments provide a 1394 network capable, in case of broadcasting of digital information for which the copying is inhibited, of preventing unlawful or erroneous recording of such digital information as in the first to third embodiments.

Fourth Embodiment

Figure 12:
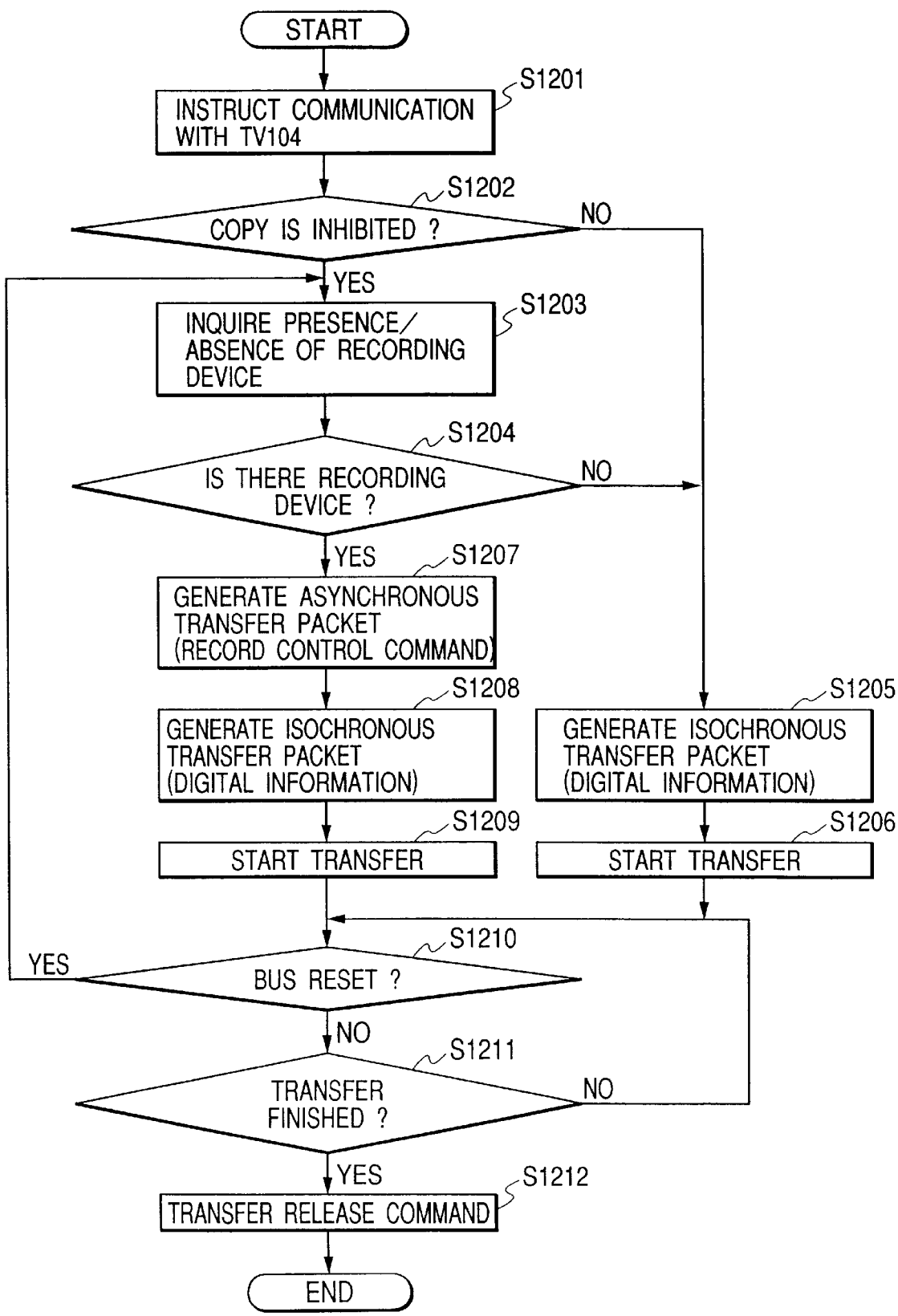
FIG. 12 is a flow chart showing the function of the communication system of the fourth embodiment.

In the following there will be explained, with reference to FIGS. 11 and 12, the process function of a communication system constituting the fourth embodiment. FIG. 12 is a flow chart showing the process of the reproduction device 101.

In case it is desired to isochronous transfer the digital information, recorded on the recording medium 201, to the TV monitor 104, the user manipulates the operation unit 207 to designate the reproduction of the recording medium 201 and to designate the TV monitor 104 as the destination of communication (step S1201).

In response to the instruction for reproducing the recording medium 201, the reproduction process unit 202 reads the copy management (inhibiting) information recorded on the recording medium 201 and sends it to the control unit 206. The control unit 206 discriminates, from the copy management information, whether the copying of the digital information is inhibited (step S1202). If the copying is not inhibited, the control unit 206 executes a process starting from a step S1205.

If the result of the step S1202 identifies that the copying is inhibited, the control unit 206 inquires the device information of all the device on the network, in order to discriminate whether a recording is present on the network (step S1203). In the step S1203 the control unit 206 generates a command for inquiring the device information (device name, kind of device, information on the functions thereof etc.) stored in the memory of each device, and sends the command to the 1394 interface unit 204, which packetizes such command into an asynchronous packet and transfers it to all the devices. The asynchronous packet employed in this operation is constructed as shown in FIG. 4, and is outputted at the timing shown in FIG. 5.

The control unit 206 of the reproduction device 101 receives the responses (namely device information of the devices) to the above-mentioned inquiry command, from the 1394 interface unit 204, and stores each response, together with the node ID of each device, in the memory provided in the control unit 206. Then, based on the device information of the devices, it discriminates whether a recording device is present on the network (step S1204).

If the result of the step S1204 identifies that the recording device is absent on the network, the control unit 206 so controls the reproduction process unit 202 as to reproduce the digital information recorded on the recording medium 201. The reproduced digital information is divided in the data process unit 203 into packet data of a predetermined data amount, which are supplied in succession to the 1394 interface unit 204. The 1394 interface unit 204 secures the band required for isochronous transfer and sets a channel number (information for identifying a series of isochronous packets). The 1394 interface unit 204 packetizes such channel number and the digital information of a predetermined amount into an isochronous packet (step S1205).

Then the 1394 interface unit 204 executes isochronous transfer of the isochronous packet generated in the step S1205 (step S1206). Then the isochronous packets are broadcast in succession in successive communication cycles. The isochronous packets are broadcast in the isochronous transfer mode in successive communication cycles. After the step S1206, the reproduction device 101 executes a process starting from the step S1210.

Figure 13:
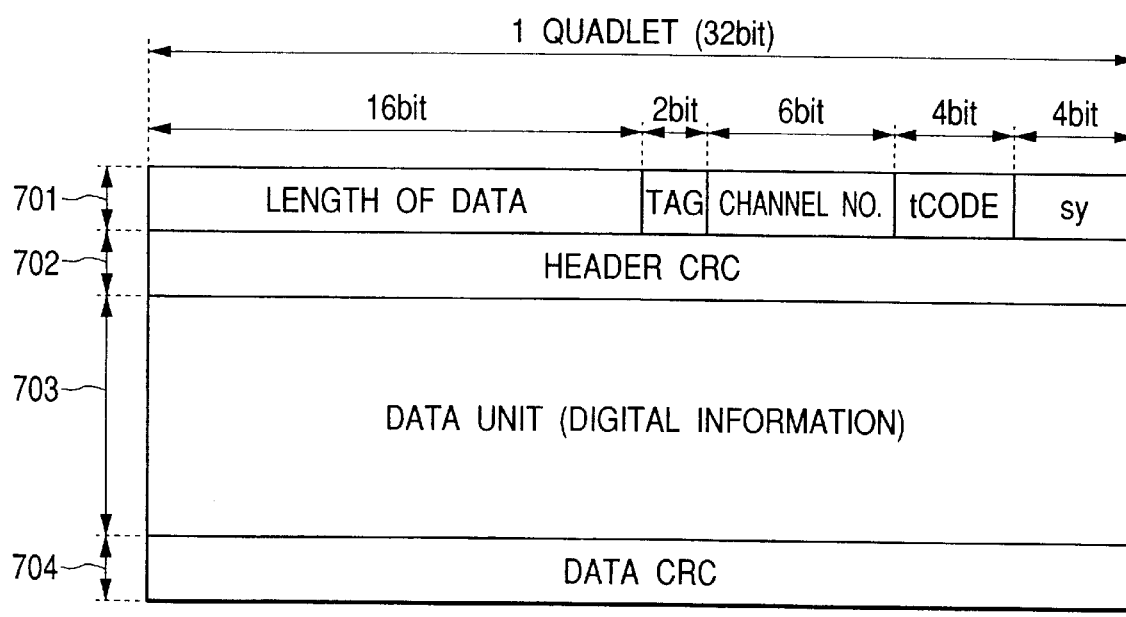
FIG. 13 is a view showing an example of the configuration of an isosynchronous packet for isosynchronous transfer of digital information.

FIG. 13 shows the configuration of the isochronous packet, employed in the isochronous transfer of the above-described digital information. Similar to the configuration shown in FIG. 7, the isochronous packet shown in FIG. 13 is composed of a header portion 701, a header CRC 702, a data portion 703 and a data CRC 704. The configuration of the packet is common in the first to sixth embodiments.

On the other hand, if the step S1204 identifies that the recording device (digital VCR-A 102, digital VCR-B 103 and TV monitor 104 in the fourth embodiment) is present on the network, the control unit 206 generates a control command (hereinafter called recording control command) for commonly terminating the function of the recording process units (212, 226) of the recording devices. The recording control command generated in the control unit 206 is supplied to the 1394 interface unit 204. The 1394 interface unit 204 reads, from the memory provided in the control unit 206, the node ID's of the plural recording devices connected to the network, and generates an asynchronous packet, having the node ID of each recording device as the destination and containing the recording control command in the data portion (step S1207).

After the step S1207, the control unit 206 so controls the reproduction process unit 202, the data process unit 203 and the 1394 interface unit 204 as to generate the isochronous packets of a predetermined amount from the digital information recorded on the recording medium 201, and the control unit 206 so controls the reproduction process unit 202 as to reproduce the digital information recorded on the recording medium 201. The reproduced digital information is divided in the data process unit 203 into packet data of a predetermined data amount, which are supplied in succession to the 1394 interface unit 204. The 1394 interface unit 204 secures a required band and sets a channel number, and packetizes the channel number and the digital information of a predetermined amount into an isochronous packet (step S1208).

Figure 14:
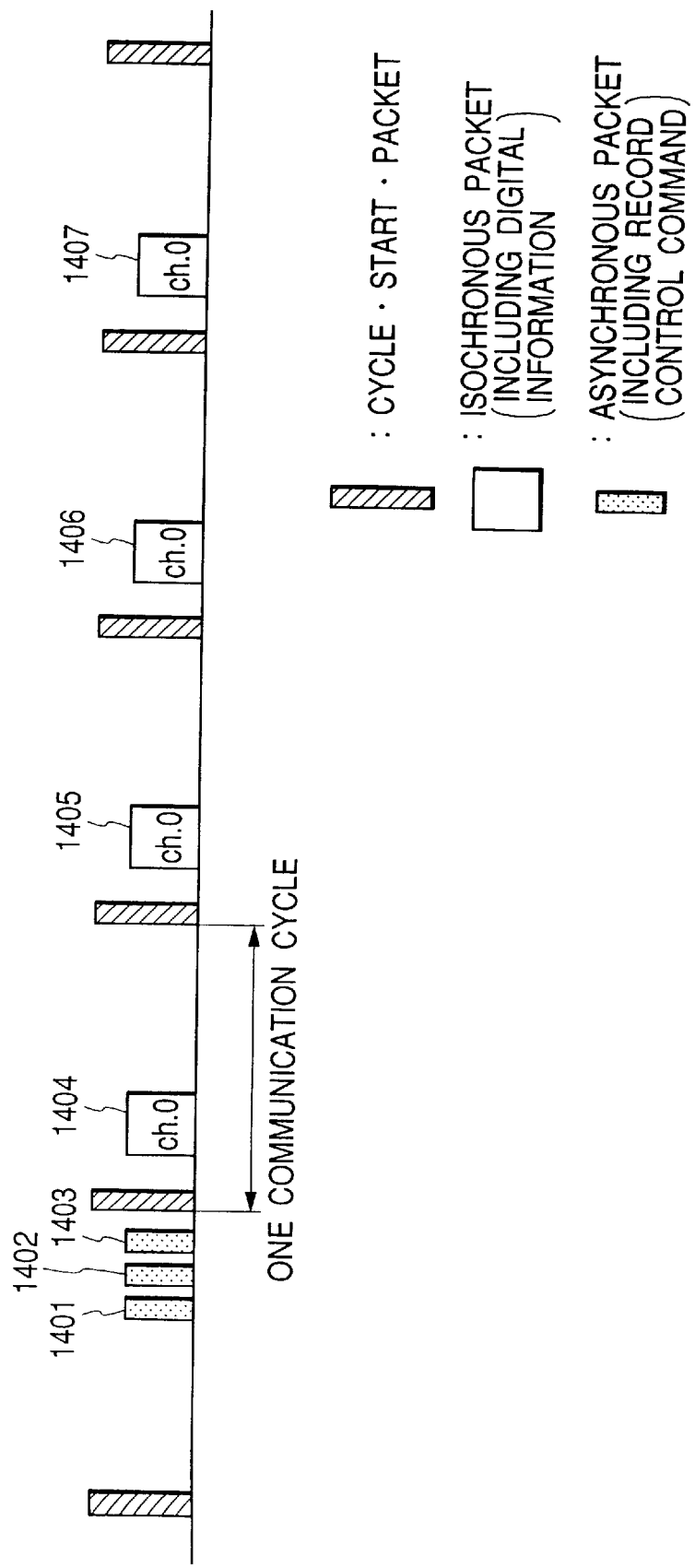
FIG. 14 is a view showing the procedure of broadcasting digital information in the fourth embodiment.

After the step S1208, the 1394 interface unit 204 executes the transfer of the above-described asynchronous packet (generated in the step S1207) and the isochronous packet (generated in the step S1208) at a timing shown in FIG. 14 (step S1209).

Referring to FIG. 14, the 1394 interface unit 204 executes asynchronous transfer of the plural asynchronous packets (1401 to 1403), generated in the step S1207, to the recording devices (102 to 104) prior to the broadcasting of the isochronous packets (containing digital information) generated in the step S1208. In the fourth embodiment, the asynchronous packets 1401, 1402, 1403 are respectively addressed to the digital VCR-A 102, digital VCR-B 103 and TV monitor 104. The recording devices 102 to 104 receiving these asynchronous packets (1401 to 1403) are so controlled to individually terminate or suspend the recording operation and return the result of such control. Therefore, the recording devices (102 to 104) cannot record the packets received after the recording control command.

After the confirmation that all of these asynchronous packets have been properly received by the recording devices (102 to 104), the reproduction device 101 executes isochronous transfer of a series of the isochronous packets generated in the step S1208. In the fourth embodiment, the packets (1404 to 1407) are isochronous packets with a channel number "0", which are broadcast on the network in successive communication cycles.

The TV monitor 104 receives the packets which are isochronous transferred from the reproduction device 101 with the channel number "0" and outputs the digital information, contained in the received packets, through the display unit 222 or the speaker 223.

In the 1394 network of the fourth embodiment, as explained in the foregoing, the recording operation alone of each recording device can be disabled prior to the broadcasting of the copy-inhibited digital information to the network, whereby the unlawful or erroneous copying of the broadcast digital information can be prevented.

The reproduction device 101 detects whether the bus resetting has been generated in the period of isochronous transfer of the digital information mentioned above (step S1210), and, if the bus resetting is detected, the network of the fourth embodiment executes initialization of the network configuration and recognition of the new connection configuration. During this operation, the reproduction device 101 interrupts the reproduction of the recording medium 201 and the transfer of the reproduced digital information.

After the recognition of the new network configuration, the reproduction device 101 again executes the procedure starting from the step S1203, thereby re-starting the reproduction and transfer interrupted by the bus resetting. Thus, if a new recording device is connected to the network during the output of the copy-inhibited digital information to the network, the connection of such recording device can be detected by the bus resetting, and there can be prevented the unlawful or erroneous copying by such recording device.

The control unit 206 continues the isochronous transfer of the digital information until the reproduction thereof is completed (step S1211). When the reproduction and transfer of the digital information are completed, the control unit 206 generates a release command for releasing the control by the above-described recording control command, and the release command generated in the control unit 206 is asynchronous transferred to the recording devices through the 1394 interface unit 204. The reproduction device 101 transfers the above-mentioned release command until the asynchronous packet is properly received by all the recording devices (step S1212), and terminates communication after the confirmation that the above-mentioned release command has been properly received and processed by all the recording devices.

In the 1394 network of the fourth embodiment, such control allows to terminate or inhibit the recording operation of all the recording devices on the network, during the broadcasting of the copy-inhibited digital information. Thus there can be prevent unlawful copying or erroneous recording of the broadcast digital information.

In the fourth embodiment, the system is so controlled as to terminate or suspend the recording operation in all the recording devices during the isochronous transfer of the copy-inhibited digital information, but such control is not restrictive. There may also be adopted control for terminating or suspending the recording function of the recording devices only in receiving the serial isochronous packets broadcast with a specified channel number, as long as the unlawful copying or erroneous recording by the recording devices can be prevented. Thus each recording device on the 1394 network can record or display the isochronous packets (containing digital information) other than those with the specified channel number. It is furthermore possible to inhibit the recording of the isochronous packet with the specified channel number but to permit the video or audio output alone thereof.

It is furthermore possible, in the fourth embodiment, not to execute asynchronous transfer of the recording control command to only the recording device permitted by the reproduction device 101, thereby permitting the recording operation to such predetermined recording device.

As explained in the foregoing, in the fourth embodiment, in case of broadcasting the copy-inhibited digital information to the 1394 network, the reproduction device 101 terminates or suspends the recording operation of all the recording devices present on the network, prior to the transfer of the digital information. Thus the reproduction device 101 can prevent the unlawful copying or erroneous recording in all the recording devices present on the network, thereby protecting the copyright of the digital information.

Fifth Embodiment

In the fourth embodiment, there has been explained a configuration in which, prior to the broadcasting of the copy-inhibited digital information, the recording control command is asynchronous transferred to each of the recording devices (102 to 104) on the network. In the fifth embodiment, prior to the broadcasting of the digital information, the recording control command is isochronous transferred to all the recording devices (102 to 104) on the network.

Figure 15:
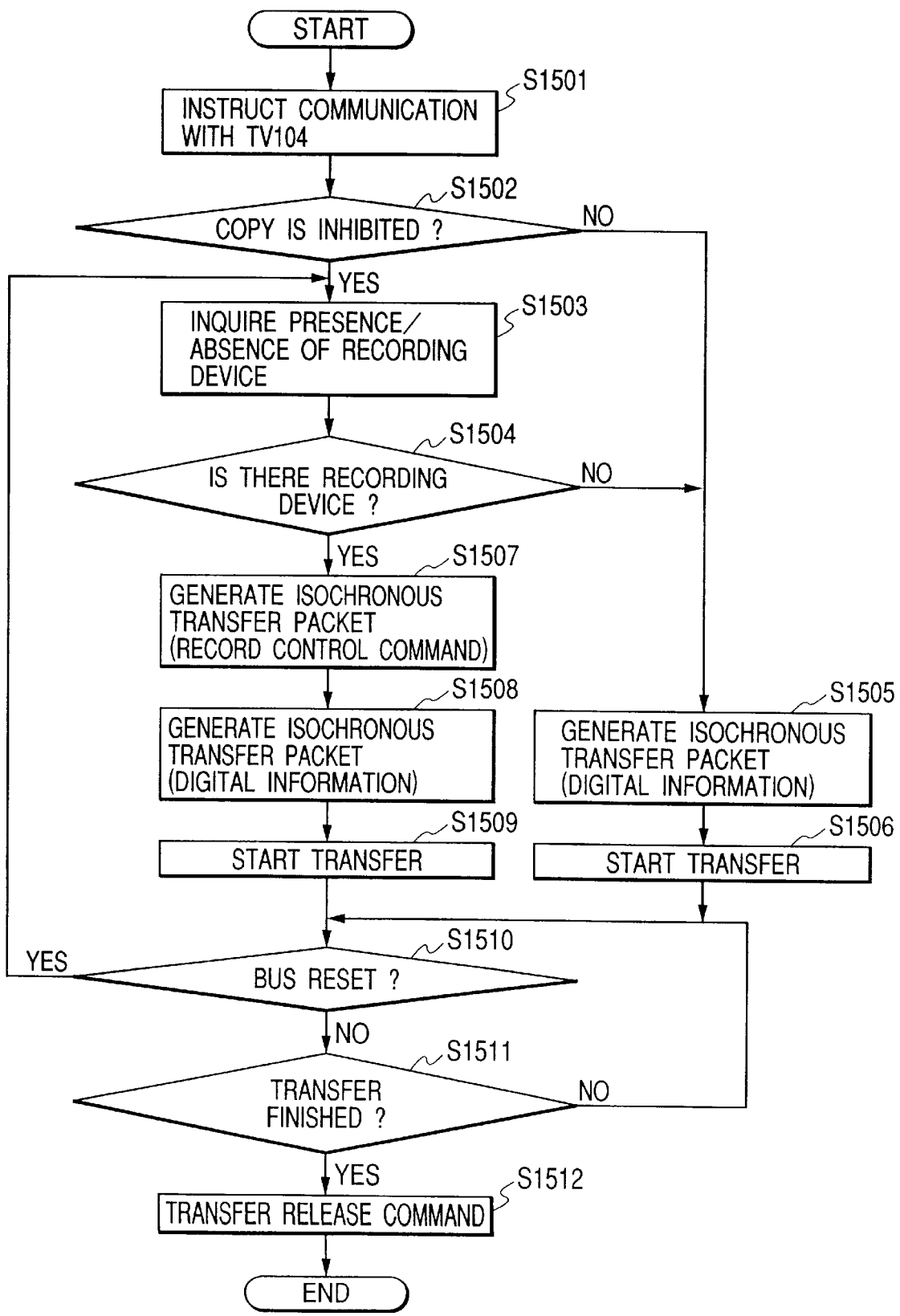
FIG. 15 is a flow chart showing the function of the communication system of the fifth embodiment.

FIG. 15 is a flow chart showing the operation sequence of the reproduction device 101 of the fifth embodiment.

In case it is desired to execute isochronous transfer of the digital information, recorded on the recording medium 201, to the TV monitor 104, the user manipulates the operation unit 207 of the reproduction device 101 to instruct the reproduction of the digital information of the recording medium 201 and designate the TV monitor 104 as the destination of communication (step S1501). In response to the instruction of reproduction of the recording medium 201, the reproduction process unit 202 reads the copy management information recorded on the recording medium 201 and sends such information to the control unit 206. Based on the copy management information, the control unit 206 discriminates whether the copying of the digital information is inhibited (step S1502). If the copying is not inhibited, the control unit 206 executes a process starting from a step S1505.

If the result of the step S1502 identifies that the copying is inhibited, the control unit 206 inquires the device information of all the devices on the 1394 network, in order to discriminate whether a recording device is present on the 1394 network (step S1503). In the step S1503, the control unit 206 generates the command for inquiring the device information as in the step S1203 in FIG. 12 and sends it to the 1394 interface unit 204, which packetizes the command into an asynchronous packet as shown in FIG. 4 and transfers it to the devices.

The control unit 206 of the reproduction device 101 receives the responses to the above-described inquiry command, from the 1394 interface unit 204, and stores the device information together with the node ID of each device in the memory provided in the control unit 206. Based on the device information of the devices, the control unit discriminates whether the recording device is present on the network (step S1504).

If the result of the step S1504 identifies that the recording device is absent on the network, the control unit 206 so controls the reproduction process unit 202 as to reproduce the digital information recorded on the recording medium 201. The reproduced digital information is divided in the data process unit 203 into packet data of a predetermined amount, which are supplied in succession to the 1394 interface unit 204. The 1394 interface unit 204 secures a necessary band and sets a channel number, and packetizes such channel number and the digital information of the predetermined amount as an isochronous packet as shown in FIG. 13 (step S1505).

Then the 1394 interface unit 204 executes isochronous transfer of the isochronous packets generated in the step S1505 (step S1506). The isochronous packets are broadcast in successive communication cycles. After the step S1506, the reproduction device 101 executes the process starting from the step S1510.

On the other hand, if the result of the step S1504 identifies that the recording device (digital VCR-A 102, digital VCR-B 103 and TV monitor 104 as in the fourth embodiment) is present on the network, the control unit 206 generates a command (hereinafter called recording control command) for commonly terminating the function of the recording process units (212, 226) in the recording devices. The recording control command generated in the control unit 206 is supplied to the 1394 interface unit 204, which secures a band required for isochronous transfer of the recording control command and sets a channel number. The 1394 interface unit 204 generates, utilizing the channel number, an isochronous packet containing the recording control command in the data portion (step S1507).

After the step S1507, the control unit 206 controls the reproduction process unit 202, the data process unit 203 and the 1394 interface unit 204 in such a manner as to generate the isochronous packets of a predetermined amount from the digital information recorded on the recording medium 201, and so controls the reproduction process unit 202 as to reproduce the digital information recorded on the recording medium 201. The reproduced digital information is divided in the data process unit 203 into packet data of a predetermined amount, which are supplied in succession to the 1394 interface unit 204. The 1394 interface unit 204 secures a necessary band and sets a channel number. The 1394 interface unit 204 packetizes the channel number and the digital information of a predetermined amount as an isochronous packet (step S1508).

After the step S1508, the 1394 interface unit 204 transfers the above-described isochronous packet (generated in the step S1507) and the isochronous packet (generated in the step S1508) at a timing shown in FIG. 8.

Figure 16:
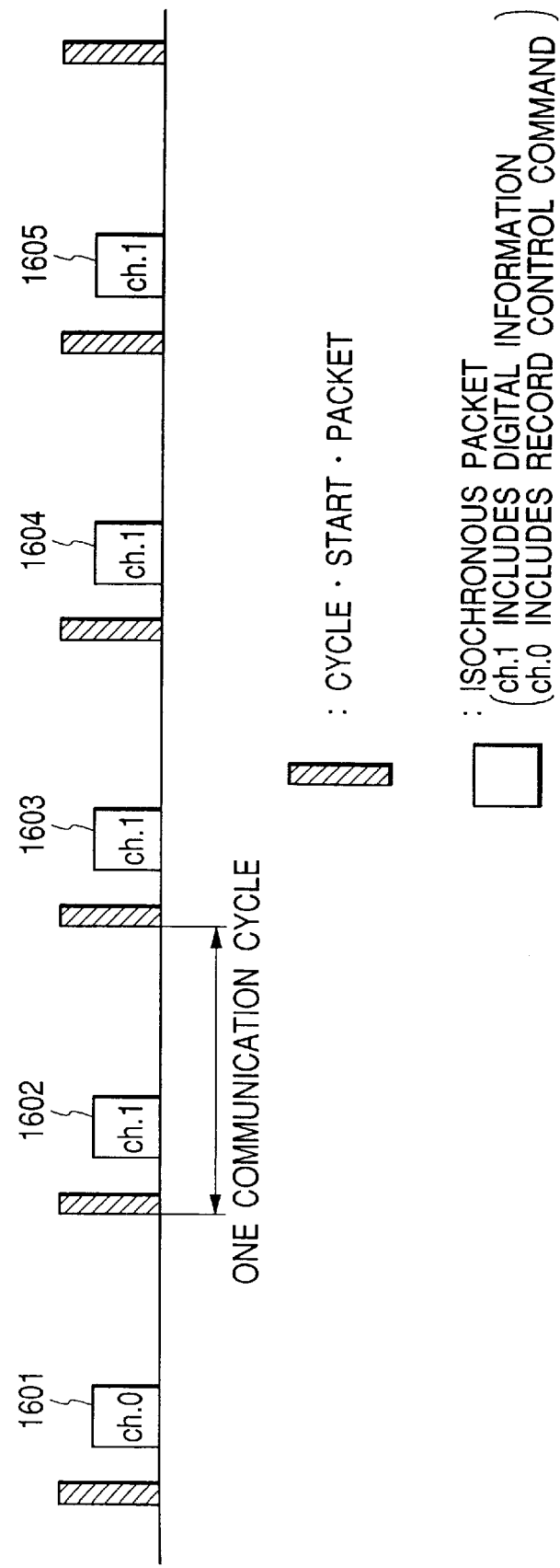
FIG. 16 is a view showing the procedure of broadcasting digital information in the fifth embodiment.

Referring to FIG. 16, the 1394 interface unit 204 broadcasts the isochronous packet 1601 (containing the recording control command) generated in the step S1507 to all the devices (102 to 104) on the network, prior to the broadcasting of the serial isochronous packets (containing the copy-inhibited digital information) 1602 to 1605 generated in the step S1508. In the fifth embodiment, the packet 1601 is an isochronous packet of a channel number "0". After the reception of the isochronous packet 1601, all the devices on the network are so controlled as to individually terminate or suspend the recording operation thereof, whereby each recording device becomes incapable of recording the packet received after the recording control command.

After the broadcasting of the isochronous packet 1601 onto the network, the 1394 interface unit 204 executes isochronous transfer of the serial isochronous packets 1602 to 1605 generated in the step S1508. In the fifth embodiment, the packets 1602 to 1605 are isochronous packets with a channel number "1", which are respectively broadcast in successive communication cycles.

The TV monitor 104 receives the serial packets which are isochronous transferred with the channel number "1" by the reproduction device 101, and outputs the digital information, contained in these packets, through the display unit 222 and the speaker 223.

As explained in the foregoing, the 1394 network of the fifth embodiment can be disable the recording function alone of the recording devices prior to the broadcasting of the copy-inhibited digital information to the network, thereby preventing unlawful copying or erroneous recording of the broadcast digital information.

The reproduction device 101 detects whether the bus resetting has been generated in the period of isochronous transfer of the digital information mentioned above (step S1510), and, if the bus resetting is detected, the network of the fifth embodiment executes initialization of the network configuration and recognition of the new connection configuration. During this operation, the reproduction device 101 interrupts the reproduction of the recording medium 201 and the transfer of the reproduced digital information.

After the recognition of the network configuration, the reproduction device 101 again executes the procedures starting from the step S1503, thereby re-starting the reproduction and transfer interrupted by the bus resetting. Thus, if a new recording device is connected to the network during the output of the copy-inhibited digital information to the network, the connection of such recording device can be detected by the bus resetting, and unlawful copying or erroneous recording by such recording device can be prevented.

The control unit 206 continues the isochronous transfer of the digital information until the reproduction thereof is completed (step S1511). When the reproduction and transfer of the digital information are completed, the control unit 206 generates a release command for releasing the control by the above-described recording control command, and the release command generated in the control unit 206 is asynchronous transferred to the recording devices through the 1394 interface unit 204 (step S1512). The reproduction device 101 terminates communication after the confirmation that the above-mentioned release command has been properly received and processed by all the recording devices.

In the 1394 network of the fifth embodiment, such control allows to terminate or suspend the recording operation of all the recording devices on the network, during the broadcasting of the copy-inhibited digital information. Thus there can be prevent unlawful copying or erroneous recording of the broadcast digital information.

In the fifth embodiment, the system is so controlled as to terminate or suspend the recording operation in all the recording devices during the isochronous transfer of the copy-inhibited digital information, but such control is not restrictive. As in the fourth embodiment, there may also be adopted control for terminating or suspending the recording function of the recording devices only in case of receiving the serial isochronous packets broadcast with a specified channel number. It is also possible to enable video or audio output only, for the isochronous packets of the specified channel number, while inhibiting the recording thereof.

As explained in the foregoing, in the fifth embodiment, in case of broadcasting the copy-inhibited digital information to the 1394 network, the reproduction device 101 terminates or suspends the recording operation of all the recording devices present on the network, prior to the transfer of the digital information. Thus the reproduction device 101 can prevent the unlawful copying or erroneous recording in all the recording devices present on the network, thereby protecting the copyright of the digital information.

Sixth Embodiment

In the fourth embodiment, there has been explained a configuration in which, prior to the broadcasting of the copy-inhibited digital information, the recording control command is asynchronous transferred to each of the recording devices (102 to 104) on the network. Also in the fifth embodiment, there has been explained a configuration in which the recording control command is isochronous transferred.

In the sixth embodiment, there will be explained a configuration in which, prior to the broadcasting of the copy-inhibited digital information, the above-mentioned digital information and the above-mentioned recording control command are stored in a same packet, and the packets thus formed are broadcast.

Figure 17:
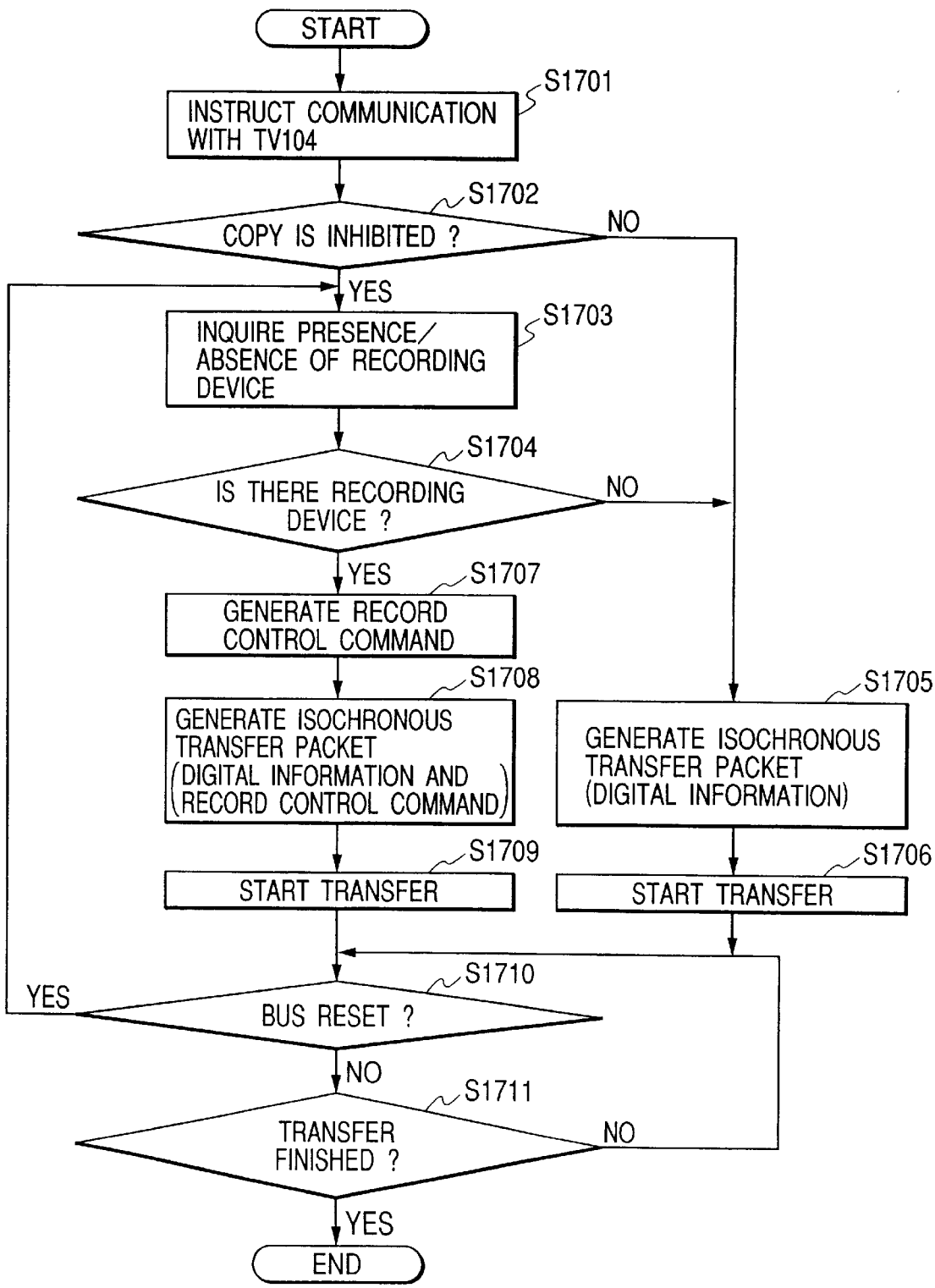
FIG. 17 is a flow chart showing the function of the communication system of the sixth embodiment.

FIG. 17 is a flow chart showing the operation sequence of the reproduction device 101 of the sixth embodiment.

In case it is desired to execute isochronous transfer of the digital information, recorded on the recording medium 201, to the TV monitor 104, the user manipulates the operation unit 207 to instruct the reproduction of the digital information of the recording medium 201 and designate the TV monitor 104 as the destination of communication (step S1701). In response to the instruction of reproduction of the recording medium 201, the reproduction process unit 202 reads the copy management information recorded on the recording medium 201 and sends such information to the control unit 206. Based on the copy management information, the control unit 206 discriminates whether he copying of the digital information is inhibited (step S1702). If the copying is not inhibited, the control unit 206 executes a process starting from a step S1705.

If the result of the step S1702 identifies that the copying is inhibited, the control unit 206 inquires the device information of all the devices on the 1394 network, in order to discriminate whether a recording device is present on the 1394 network (step S1703). In the step S1703, the control unit 206 generates the command for inquiring the device information as in the step S1203 in FIG. 12 and sends it to the 1394 interface unit 204, which packetizes the command into an asynchronous packet as shown in FIG. 4 and transfers it to the devices.

The control unit 206 of the reproduction device 101 receives the responses to the above-described inquiry command, from the 1394 interface unit 204, and stores the device information together with the node ID of each device in the memory provided in the control unit 206. Based on the device information of the devices, the control unit discriminates whether the recording device is present on the network (step S1704).

If the result of the step S1704 identifies that the recording device is absent on the network, the control unit 206 so controls the reproduction process unit 202 as to reproduce the digital information recorded on the recording medium 201. The reproduced digital information is divided in the data process unit 203 into packet data of a predetermined amount, which are supplied in succession to the 1394 interface unit 204. The 1394 interface unit 204 secures a necessary band and sets a channel number, and packetizes such channel number and the digital information of the predetermined amount as an isochronous packet as shown in FIG. 13 (step S1705).

Then the 1394 interface unit 204 executes isochronous transfer of the isochronous packets generated in the step S1705 (step S1706). The isochronous packets are respectively broadcast in successive communication cycles. After the step S1706, the reproduction device 101 executes the process starting from the step S1710.

On the other hand, if the result of the step S1704 identifies that the recording device (digital VCR-A 102, digital VCR-B 103 and TV monitor 104 as in the fourth embodiment) is present on the network, the control unit 206 generates a command (hereinafter called recording control command) for commonly terminating the function of the recording process units 212, 226) in the recording devices (step S1707). The recording control command generated in the control unit 206 is supplied to the 1394 interface unit 204.

After the step S1707, the control unit 206 so controls the reproduction process unit 202 as to reproduce the digital information recorded on the recording medium 201. The reproduced digital information is divided in the data process unit 203 into packet data of a predetermined amount, which are supplied in succession to the 1394 interface unit 204. The 1394 interface unit 204 secures a necessary band and sets a channel number. The 1394 interface unit 204 packetizes the channel number, the digital information of a predetermined amount and the recording control command generated in the control unit 206 into isochronous packets in succession (step S1708).

Figure 18:
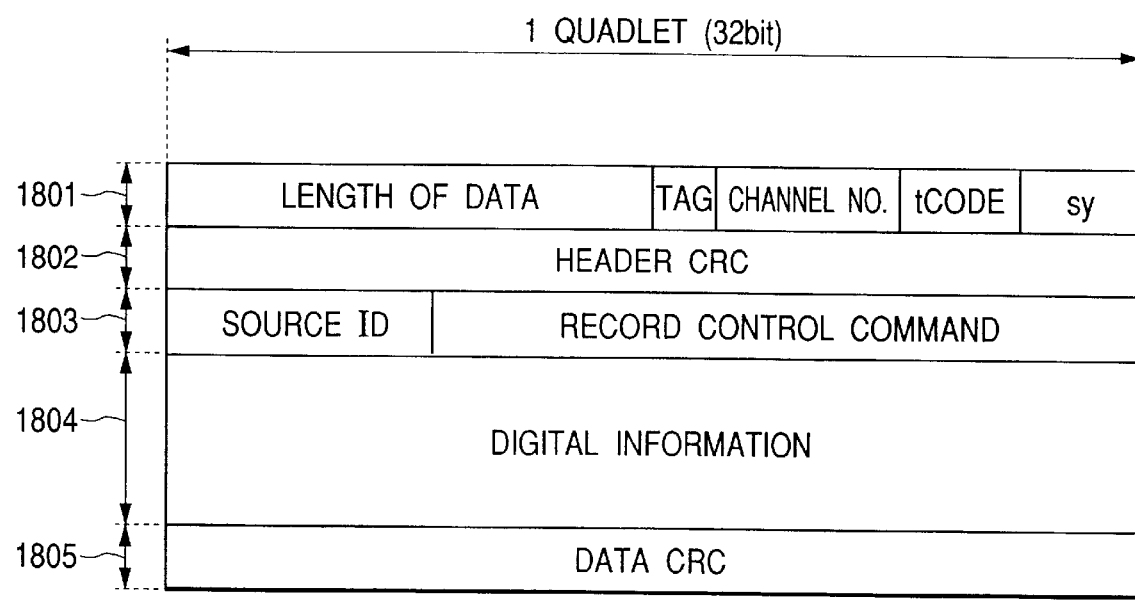
FIG. 18 is a view showing an example of the configuration of an isosynchronous packet (including digital information and a record control command) broadcast in the sixth embodiment.

FIG. 18 shows the configuration of the isochronous packet (containing digital information and recording control command) generated in the step S1708.

In FIG. 18, there are provided a header portion 1801, a header CRC 1802, a part 1803 of the data portion, for storing the node ID of the source (reproduction device 101) and the recording control command, another part 1804 of the data portion for storing the digital information of a predetermined amount, and a data CRC 1805.

The isochronous packets generated in the step S1708 are transferred through the 1394 interface unit 204 at a timing shown in FIG. 19 (step S1709).

Referring to FIG. 19, the 1394 interface unit 204 broadcasts the serial isochronous packets (each containing copy-inhibited digital information and recording control command) 1901 to 1905, generated in the step S1708, to all the devices (102 to 104) on the network. In the sixth embodiment, the packets 1901 to 1905 are isochronous packets with a channel number "0". Each of the recording devices on the network is so controlled, upon detecting the recording control command contained in each of the isochronous packets 1901 to 1905, as to terminate the recording operation only for the digital information contained in such isochronous packet. Consequently each recording device becomes incapable of recording the isochronous packet containing the recording control command.

The TV monitor 104 receives the serial packets 1901 to 1905 which are isochronous transferred with the channel number "0" by the reproduction device 101, and outputs the digital information, contained in these packets through the display unit 222 and the speaker 223.

As explained in the foregoing, the 1394 network of the sixth embodiment can disable the recording function alone of the recording devices prior to the broadcasting of the copy-inhibited digital information to the network, thereby preventing unlawful copying or erroneous recording of the broadcast digital information.

The reproduction device 101 detects whether the bus resetting has been generated in the period of isochronous transfer of the digital information mentioned above (step S1710), and, if the bus resetting is detected, the network of the sixth embodiment executes initialization of the network configuration and recognition of the new connection configuration. During this operation, the reproduction device 101 interrupts the reproduction of the recording medium 201 and the transfer of the reproduced digital information.

After the recognition of the new network configuration, the reproduction device 101 again executes the procedure starting from the step S1703, thereby re-starting the reproduction and transfer interrupted by the bus resetting. Thus, if a new recording device is connected to the network during the output of the copy-inhibited digital information to the network, the connection of such recording device can be detected by the bus resetting, and unlawful copying or erroneous recording by such recording device can be prevented.

The control unit 206 continues the isochronous transfer of the digital information until the reproduction thereof is completed (step S1711).

In the 1394 network of the sixth embodiment, such control allows to terminate or suspend the recording operation of all the recording devices on the network, during the broadcasting of the copy-inhibited digital information. Thus there can be prevent unlawful copying or erroneous recording of the broadcast digital information.

In the sixth embodiment, there has been explained the configuration which, in case of broadcasting the copy-inhibited digital information on the network, stores the recording control command in all the isochronous packets generated from the digital information and broadcasting such isochronous packet, but such configuration is not restrictive. It is also possible, for example as shown in FIGS. 20 and 21, to include the recording control command and the digital information in mutually different packets and transfer these packets on a time-shared basis within a communication cycle time.

FIG. 20 shows the mode of packetizing the recording control command in an asynchronous packet and transferring such packet together with the isochronous transferred digital information. In FIG. 20, there are shown an asynchronous packet 2001 addressed to the digital VCR-A 102, an asynchronous packet 2002 addressed to the digital VCR-B 103, and an asynchronous packet 2003 addressed to the TV monitor 104.

FIG. 21 shows the mode of packetizing the recording control command in an isochronous packet channel number "0") and transferring such packet together with the digital information (channel number "1"). There is also shown an isochronous packet 2101 containing the recording control command.

Also, the control of the sixth embodiment is to terminate or suspend the recording operation of all the recording devices on the network, but such control is not restrictive. It is also possible, for example, to permit the recording operation to a predetermined recording device only, by executing asynchronous transfer in advance of a release command, releasing the recording control command.

As explained in the foregoing, in the sixth embodiment, in case of broadcasting the copy-inhibited digital information to the 1394 network, the reproduction device 101 stores the recording control command in all the packets generated from the digital information and broadcasting such packets. All the devices receiving such packets terminate the recording of the digital information contained in the packets. Thus the reproduction device 101 can prevent the unlawful copying or erroneous recording in all the recording devices present on the network, thereby protecting the copyright of the digital information.

The present invention can be embodied in various forms without departing from the spirit or the main features thereof.

For example the objects of the present invention can be attained by supplying the control unit (including a microcomputer) for controlling the system or apparatus of the aforementioned embodiments with a memory medium storing the program codes of a software realizing the functions of the foregoing embodiments, and causing such control unit to read the program codes stored in the memory medium and to control the system or apparatus so as to realize the functions of the foregoing embodiments.

For example, it is possible to store the program codes realizing the process and functions of the first embodiment shown in FIG. 3, the second embodiment shown in FIG. 9 and the third embodiment shown in FIG. 10 respectively in the memories provided in the control units 206, 214, 224 shown in FIG. 2, and to cause such control units 206, 214, 224 to respectively read such program codes and to control the digital VCR-A 102, the digital VCR-B 103 and the TV monitor 104 so as to realize the functions of the foregoing embodiments.

It is also possible to store the program codes realizing the process and functions of the fourth embodiment shown in FIG. 12, the fifth embodiment shown in FIG. 15 and the sixth embodiment shown in FIG. 17 respectively in the memories provided in the control units 206, 214, 224 shown in FIG. 11, and to cause such control units 206, 214, 224 to respectively read such program codes and to control the digital VCR-A 102, the digital VCR-B 103 and the TV monitor 104 so as to realize the functions of the foregoing embodiments.

In such case, the program codes themselves read from the memory medium realize the functions of the foregoing embodiments, and the memory medium storing such program codes constitutes a part of the present invention.

The memory medium for supplying the program codes can be, for example, a floppy disk, a hard disk, an optical disk, a magnetooptical disk, a CD-ROM, a CD-R, a magnetic tape, a non-volatile memory card or a ROM.

The present invention naturally includes a case where an operating system or another application software functioning on the above-mentioned control unit controls the system or apparatus of the foregoing embodiment, under the instruction of the program codes read by the control unit from the memory medium, thereby realizing the functions of the foregoing embodiments.

The present invention further includes a case where the program codes read from the memory medium are once written into a memory provided in a function expansion board or a function expansion unit connected to the aforementioned control unit and a CPU or the like provided in such function expansion board or function expansion unit controls the system or apparatus of the foregoing embodiments, thereby realizing the functions thereof.

Consequently the foregoing embodiments are more examples in all aspects, and should not be construed in restrictive manner.

What is claimed is:

1. A reproducing apparatus comprising:

a reproducing unit adapted to reproduce digital information from a recording medium;

a communication unit adapted to output the digital information to a network connected to the communication unit;

a control unit adapted to perform a first detecting process that detects whether or not copying of the digital information is limited, to perform a second detecting process that detects whether or not a recording apparatus exists on the network, and to decide to perform either a first or a second outputting process using results of the first and second detecting processes, wherein the first outputting process is a process that outputs, from the communication unit to the network, the digital information with control information for preventing a recording process of the digital information by the recording apparatus, and wherein the second outputting process is a process that outputs, from the communication unit to the network, the digital information without outputting the control information.

2. A reproducing apparatus according to claim 1, wherein the first outputting process is a process that outputs the digital information with the control information using one communication packet.

3. A reproducing apparatus according to claim 1, wherein the first outputting process is a process that isochronously outputs the digital information with the control information.

4. A controlling method for a reproducing apparatus having a reproducing unit adapted to reproduce digital information from a recording medium, and a communication unit adapted to output the digital information to a network connected to the communication unit, the method comprising steps of:

performing a first detecting process that detects whether or not copying of the digital information is limited;

performing a second detecting process that detects whether or not a recording apparatus exists on the network; and deciding whether to use a first or a second outputting process using results of the first and second detecting processes, wherein the first outputting process is a process that outputs, from the communication unit to the network, the digital information with control information for preventing a recording process of the digital information by the recording apparatus, and wherein the second outputting process is a process that outputs, from the communication unit to the network, the digital information without outputting the control information.

5. A controlling method according to claim 4, wherein the first outputting process is a process that outputs the digital information with the control information using one communication packet.

6. A controlling method according to claim 4, wherein the first outputting process is a process that isochronously outputs the digital information with the control information.

* * * * *

UNITED STATES PATENT AND TRADEMARK OFFICE
CERTIFICATE OF CORRECTION

PATENT NO. : 6,678,464 B1
DATED : January 13, 2004
INVENTOR(S) : Kawai et al.

It is certified that error appears in the above-identified patent and that said Letters Patent is hereby corrected as shown below:

Column 1,
Line 14, "handing" should read -- handling --; and
Line 16, "bidirectional communicational" should read -- of bidirectional communication --.

Column 4,
Line 50, "on own" should read -- of its own --.

Column 5,
Line 31, "stored" should read -- stores --; and "capable" should read -- capable of --.

Column 7,
Line 57, "these" should read -- this --; and
Line 61, "off" should read -- off" --.

Column 11,
Line 24, "these" should read -- this --.

Column 14,
Line 26, "these" should read -- this --.

Column 15,
Line 22, "interupts" should read -- interrupts --; and
Line 65, "of f" should read -- off --.

Column 17,
Line 53, "device" should read -- devices --; and
Line 54, "recording" should read -- recording device --.

Column 20,
Line 5, "prevent" should read -- prevented --.

Column 22,
Line 29, "be" should be deleted.

Column 23,
Line 3, "prevent" should read -- prevented --; and
Line 53, "he" should read -- the --.

UNITED STATES PATENT AND TRADEMARK OFFICE
CERTIFICATE OF CORRECTION

PATENT NO. : 6,678,464 B1
DATED : January 13, 2004
INVENTOR(S) : Kawai et al.

It is certified that error appears in the above-identified patent and that said Letters Patent is hereby corrected as shown below:

Column 24,
Line 33, "212," should read -- (212, --.

Column 25,
Line 46,"prevent" should read -- prevented --; and
Line 53, "he" should read -- the --.

Column 24,
Line 33, "212," should read -- (212, --.

Column 25,
Line 26, "prevent" should read -- prevented --; and
Line 53, "packet," should read -- packets, --.

Column 26,
Line 2, "channel" should read -- (channel --; and
Line 28,"example" should read -- example, --.

Signed and Sealed this

Eighteenth Day of January, 2005

JON W. DUDAS
*Director of the United States Patent and Trademark Office*